United States Patent
Komatsu et al.

(10) Patent No.: US 7,394,191 B2
(45) Date of Patent: Jul. 1, 2008

(54) IMAGE DISPLAY DEVICE HAVING A LONG-LIFE PHOSPHOR LAYER

(75) Inventors: Masaaki Komatsu, Kokubunji (JP); Masatoshi Shiiki, Musasimurayama (JP); Ryo Inoue, Kokubunji (JP)

(73) Assignee: Hitachi Displays, Ltd., Chiba-ken (JP)

( * ) Notice: Subject to any disclaimer, the term of this patent is extended or adjusted under 35 U.S.C. 154(b) by 176 days.

(21) Appl. No.: 10/872,591

(22) Filed: Jun. 22, 2004

(65) Prior Publication Data
US 2005/0012447 A1    Jan. 20, 2005

(30) Foreign Application Priority Data
Jul. 15, 2003   (JP) ............... 2003-196858
Apr. 22, 2004   (JP) ............... 2004-126221

(51) Int. Cl.
*H01J 1/62* (2006.01)
(52) U.S. Cl. .................. 313/486; 313/495; 313/467; 252/301.4 R; 252/301.6 S
(58) Field of Classification Search .................. None
See application file for complete search history.

(56) References Cited
U.S. PATENT DOCUMENTS
6,812,636 B2 * 11/2004 Porter et al. ............. 313/496
6,876,142 B2 * 4/2005 Komatsu et al. ......... 313/495
2003/0102797 A1 * 6/2003 Kajiwara ................. 313/486

FOREIGN PATENT DOCUMENTS
| EP | 1273645 A1 | * | 1/2003 |
| JP | 10-261367 | | 3/1997 |
| JP | 2001-192813 | | 1/2000 |
| JP | 2000096045 A | * | 4/2000 |
| JP | 2002265942 A | * | 9/2002 |

OTHER PUBLICATIONS

K. Kajiwara, "Cross-Sectional Transmission Electron Microscopy Investigation of the Dead Layer of ZnS:AgAl Phosphors in Field Emission Displays", J. Vac. Sci. Technol. (Jul./Aug. 2001), vol. 19, No. 4, pp. 1083-1089.

Swart et al., "Degradation of Zinc Sulfide Phosphors Under Electron Bombardment", J. Vac. Sci. Technol. (May/Jun. 1996), vol. 14, No. 3, pp. 1697-1703.

* cited by examiner

*Primary Examiner*—Sikha Roy
(74) *Attorney, Agent, or Firm*—Reed Smith LLP; Stanley P. Fischer, Esq.; Juan Carlos A. Marquez, Esq.

(57) ABSTRACT

The disclosed method can improve the luminescence life of an image display device. By using a blue luminescent phosphor having the phosphor component ZnS:M, N (where M is one or more elements selected from Cu, Ag, and Au, and N is one or more elements selected from Al, Ga, In, and Cl); wherein a shoulder is observed at around 400 nm (3.10 eV) of a cathode-luminescence spectrum of a field-emission display. A phosphor of a field-emission display of the present invention has improved characteristics against deterioration by electron-beam irradiation and an excellent luminescence maintenance factor, therefore, the luminescence life characteristics of a display are improved.

3 Claims, 15 Drawing Sheets

IMAGE DISPLAY DEVICE HAVING A LONG-LIFE PHOSPHOR LAYER

CLAIM OF PRIORITY

The present application claims priority from Japanese application JP 2003-196858 filed on Jul. 15, 2003, Japanese application JP 2004-126221 filed on Apr. 22, 2004, the contents of which are hereby incorporated by reference into this application.

FIELD OF THE INVENTION

This invention relates to a field-emission display (hereinafter referred to as FED) comprising a faceplate on which a phosphor layer is formed and an electron source which irradiates an electron beam onto aforementioned phosphor layer, and more particularly to a display using. ZnS phosphor as a phosphor constituting the phosphor layer.

BACKGROUND OF THE INVENTION

Research and development of various display devices have been carried out in image information systems according to a variety of demands such as high resolution, wide screen, thin type and low power consumption. Display devices using Braun tubes have mainly been used up to now, but there is a limit to making it thinner. Recently, research and development of FEDs are actively being carried out to achieve a thin type and low power consumption display according to such demands.

An FED has a structure, wherein a flat-shaped field-emission electron source is placed at the back plane of an enclosed vacuum box and a phosphor layer at the inside surface of a front faceplate, and by irradiating the phosphor layer with a low accelerating voltage electron beam on the order of approximately 0.1-10 kV accelerating voltage, the phosphor glows and an image is displayed. Herein, the electron density of the electron beam irradiated onto the phosphor layer is about 10-1000 times higher than that of a conventional Braun tube, thereby low resistance characteristics are required in the FED phosphor layer so as not to cause electron charge saturation Moreover, excellent characteristic of life under high electron density and high luminance characteristics with low luminescence saturation are also necessary.

Heretofore, a variety of research has been carried out to realize a long-life phosphor layer. Regarding crystal defects of the phosphor, as written in nonpatent document 1, crystal defects of a ZnS:Ag,Al phosphor were analyzed by observation with a transmission electron microscope (TEM), in phosphor No. P55 it is reported that the luminescent maintenance factor is excellent because of a small number of crystal defects. Additionally, as reported in Non-patent document 2, by irradiating an electron beam onto the ZnS phosphor, sulfur on the surface is eliminated, and formation of ZnO progresses. As a method to improve the performance of a phosphor for an FED, there is a means, as described in Patent document 1 for instance, to improve the crystallinity of a blue SrGa$_2$S$_4$:Ce phosphor layer by annealing in a reduced pressure atmosphere containing H$_2$S. Moreover, although it is for electroluminescence (EL) and not for an FED, as described in nonpatent document 2 there is a means that an SrS system luminescence layer is treated in a sulfur atmosphere to reduce impurities and control the addition of luminescence centers.

Heretofore, various methods have been examined to achieve low resistance, long life, and high luminescence of phosphor layers for FEDs. However, all the problems have not been solved by the methods of the prior art. Especially, a new means is necessary to achieve long phosphor life.

[Patent document 1] JP-A 261367/1998
[Patent document 2] JP-A 192813/2001
[Non-patent document 1] J. Vac. Sci. Technol. A19 (2001) 1083
[Non-patent document 2] J. Vac. Sci. Technol. A14 (1996) 1697

SUMMARY OF THE INVENTION

Therefore, it is an objective of the present invention to provide a display having excellent characteristics by providing long life to the phosphor layer for an FED.

The above-described objective will be accomplished by a field-emission type display comprising a faceplate on which a phosphor layer is formed and an electron source which irradiates an electron beam onto said phosphor layer, wherein a display includes a blue luminescence phosphor constituting the aforementioned phosphor layer with the component ZnS: M,N (where M is one or more elements selected from Cu, Ag and Au, and N is one or more elements selected from Al, Ga, In, and Cl), in which a phosphor has a shoulder in a cathode-luminescence spectrum at around 400 nm (3.10 eV). Additionally, a phosphor may be used, which has a luminescence intensity at 400 nm in the cathode-luminescence spectrum 2.5 times or greater, or 3.5 times or greater than the intensity fitting a Gaussian curve. Moreover, for a green luminescence phosphor, the objective will be accomplished by using a phosphor having a shoulder in the cathode-luminescence spectrum at around 450 nm (2.76 eV). Furthermore, a phosphor may be used, which has a luminescence intensity at 450 nm in the cathode-luminescence spectrum 9.0 times or greater than the intensity fitting a Gaussian curve.

In the above mentioned phosphors, the brightness, luminescent maintenance factor, and chromaticity are improved by using a phosphor characterized by adding at least one element selected from group IIa into a ZnS host crystal to form a mixed crystal and containing a small amount of impurities selected from the rare-earths. As impurities, elements of group Ia or group VIIb may be added while a phosphor is being synthesized. Regarding the formation of the phosphor layer, by making the median diameter 7 µm or less and the phosphor layer average thickness 15 µm or less, the above-mentioned objective of manufacturing an excellent phosphor layer can be achieved by using a screen-printing method. Moreover, saturation with electric charge is improved by using a phosphor wherein the surface of the phosphor is coated with a transparent conductive layer including a transparent conductive material, which is a metallic oxide containing one material selected from In$_2$O$_3$, MgO, and Sn$_2$O as a main component.

A display with excellent luminescence and characteristic of life can be provided by using a phosphor wherein the distribution of the concentration of luminescence center elements at the phosphor surface is 10% or less or 5% or less.

Long life of a display can be realized by using a phosphor which has a luminescence peak at around 190K in the temperature characteristics which is obtained by detecting the amount of luminescence while increasing the temperature of the phosphor at a constant heating rate by exciting the phosphor with light from 168 nm vacuum-ultraviolet rays. A phosphor may be used wherein the amount of luminescence at 195K is 95% or more of that at 155K. Moreover, long life can be achieved by a display comprising a phosphor which has an N/M mole ratio at the phosphor surface of 0.5 or less and an N/M mole ratio of the overall phosphor of 1.0 or more. A phosphor wherein the N/M mole ratio at the phosphor surface is 0.2 or less may also be used. Furthermore, long life can be achieved by a display comprising a phosphor which has a highly crystalline first layer with few sulfur vacancies at the phosphor surface and a second layer with an N/M mole ratio having the above-mentioned values.

Additionally, the aforementioned objective can be accomplished by a display comprising a sulfide system phosphor wherein the luminescent maintenance factor is improved by reducing the sulfur vacancy concentration of the phosphor constituting the phosphor layer. ZnS:Cu,Al, ZnS:Cu,Au,Al, ZnS:Ag,Al, ZnS:Ag,Cl, and $Y_2O_2S$:Eu can be given as the component of the sulfide system phosphor.

The thermal glow curve, which measures the amount of thermoluminescence generated by electrons captured in crystal defects and released with increasing temperature of the phosphor at a constant heating rate after exciting the phosphor by ultraviolet rays of 254 nm, is used as a means to confirm the reduction of the sulfur vacancy concentration. The reduction of the sulfur vacancy concentration can be confirmed by reducing the thermoluminescent intensity related to the sulfur vacancy concentration detected at 350K-600K in the thermal glow curve. Moreover, the sulfur vacancy concentration may be reduced by annealing at a treatment temperature of 100° C.-600° C. in a $H_2S$ gas atmosphere after forming the phosphor layer inside of the faceplate.

This method may be applied to a phosphor used for a vacuum fluorescent display.

Long life can be achieved by a display comprising a phosphor of the aforementioned phosphor layer in a vacuum fluorescent display, which consists of an anode, grid, and filament and has a thermoelectron source irradiating thermoelectrons emitted from the filament onto the phosphor layer, wherein the phosphor has one or more components selected from ZnS:Cl, ZnCdS:Ag,Cl, ZnS:Cu,Al, ZnS:Cu,Au,Al, ZnS:Ag, Al, ZnS:Ag,Cl, and $Y_2O_2S$:Eu, and the sulfur vacancy concentration can be reduced by annealing at a treatment temperature of 100° C.-600° C. in a $H_2S$ gas atmosphere.

Moreover, long life is achieved by using a phosphor wherein the surface of the above-mentioned phosphors are coated with a transparent conductive layer including a transparent conductive material, which is a metallic oxide containing one material selected from $In_2O_3$, MgO, and $Sn_2O$ as a main component. Furthermore, the same effect can be obtained by mixing these transparent conductive materials with the phosphor.

A display of the present invention is designed to have long life.

DETAILED DESCRIPTION OF THE PREFERRED EMBODIMENTS

The following are detailed descriptions of the manufacturing method of a phosphor used for a display of the present invention and each characteristic such as the luminescent maintenance factor. However, the following embodiments are intended to illustrate the present invention and are not to be construed to limit the scope of the invention.

First Embodiment

ZnS:Cu,Al phosphor (phosphor core), a raw material reducing the sulfur vacancies at the surface by a sulfurating treatment of the present invention, can be produced by the following method. ZnS (zinc sulfide raw powder) was used as a host raw material. Cu used for an activator was made by dissolving $CuSO_4.5H_2O$ into pure water to make a $10^{-4}$ mol/ml solution, and a predetermined amount of the solution was added. Al used for an activator was made by solving $Al(NO_3)_3.9H_2O$ into pure water to make a $10^{-4}$ mol/ml solution, and a predetermined amount of the solution was added. In the case of ZnS:Cu, Al phosphor (Cu=100 ppm by weight, Al=100 ppm by weight), the amount of each raw material is as follows:

| Zinc sulfide raw powder | ZnS | 9.746 g |
|---|---|---|
| Cu solution | Cu | 0.153 ml |
| Al solution | Al | 0.361 ml |

The above-mentioned raw materials were well mixed and dried. Next, the mixture of phosphor raw material obtained was packed in a silica boat, set into a quartz tube in a tubular synthesis furnace, and then fired. After a complete purge with Ar gas, firing was carried out in hydrogen sulfide atmosphere by flowing $H_2S$ gas at 100 ml/min through the quartz tube.

The firing temperature is controlled to be 950° C. and the firing time two hours. After the fired product was crushed lightly, it was sieved to obtain the phosphor core used for the present invention.

Next, the thermal glow curve of the ZnS:Cu,Al phosphor core was measured. The measurement sample was prepared by forming a phosphor layer on a Ni-plated Cu substrate by a sedimentation method.

Figure 1:
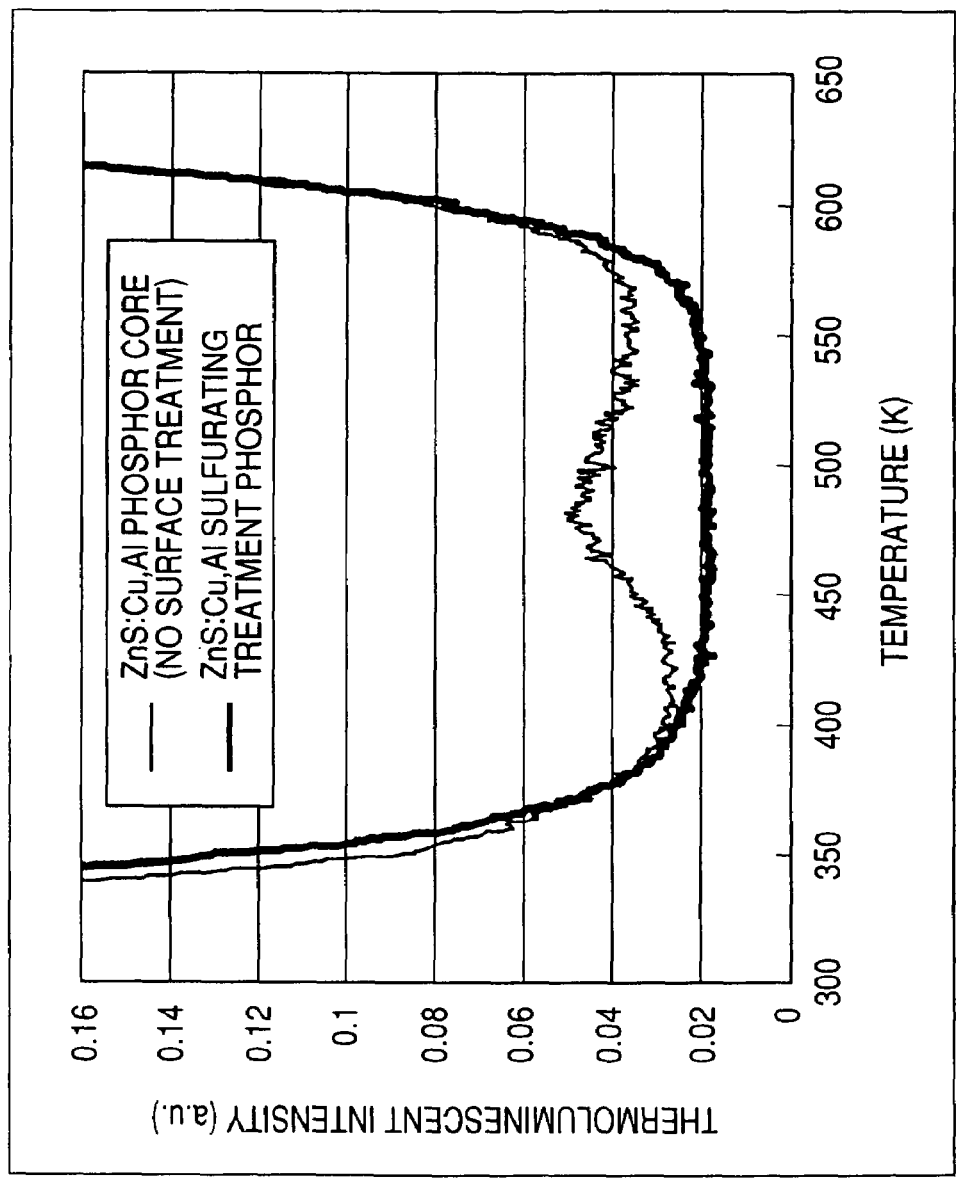
FIG. 1 is a graph showing the thermal glow curves of ZnS:Cu, Al phosphors of the present invention.
Figure 2:
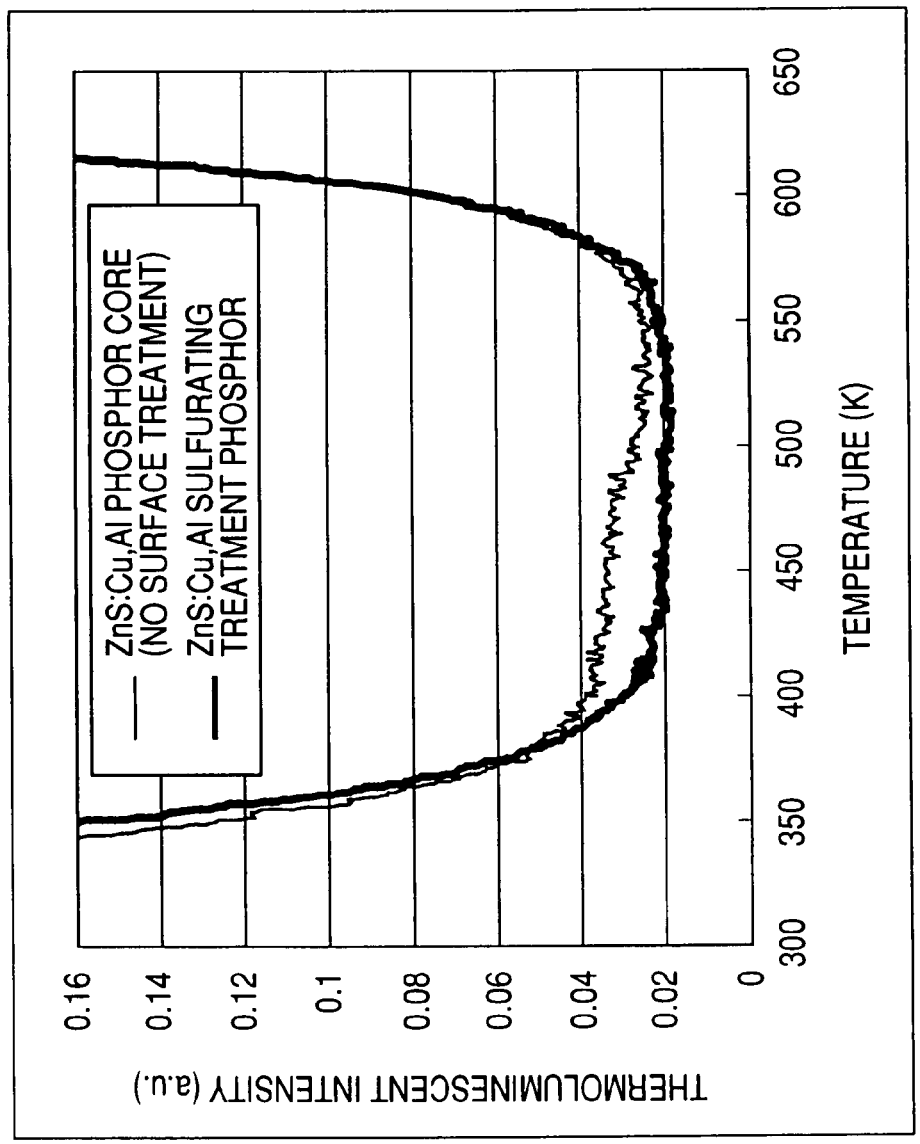
FIG. 2 is a graph showing the thermal glow curves of ZnS:Cu, Al phosphors of the present invention.

The measurement sample was set into a vacuum chamber, drawn under vacuum, and then cooled to about 80K using liquid nitrogen. After irradiating the sample with ultraviolet rays (254 nm) for one hour using a mercury vapor lamp as an excitation light, it was left stand for fifteen minuets, and then the heater was turned on. Five minutes later, the measurement started when the temperature of the sample reached 90K. The heating rate was controlled to be 0.1 K/sec this time. Because the shape of the thermal glow curve changes depending on the heating rate, it is preferable to keep the value of heating rate strictly constant. In so doing, the precision of the experiment was enhanced by making the correlation coefficient between temperature and time to be 0.9999. Moreover, because the efficiency of the thermoluminescence decreased in a high temperature region, the measurement was carried out using different amplifier gains in two separate measurement regions, a low-temperature region (90-300K) and a high-temperature region (300-650K). Thus, the temperature of the sample was raised linearly after excitation by irradiated ultraviolet rays and the generated luminescence of the phosphor was detected by a photomultiplier. This signal was recorded by a computer through an amplifier. The measurement results of the thermal glow curves of the ZnS:Cu,Al phosphor core (samples 1 and 2) are shown in FIGS. 1 and 2. In FIG. 1, vacancies relating to sulfur, which had a peak around 480K and spread across a wide area from 350K to 600K, were observed. On the other hand, FIG. 2 shows a thermal glow curve for the case of a relatively small amount of sulfur vacancies, wherein a broad peak spreading across a wide region from 350K to 600K is observed and a step can be seen in the thermal glow curve at 450K-550K.

Next, the sulfurating treatment repairs sulfur vacancies at the surface of the phosphor and reduces the concentration of sulfur vacancies. The ZnS:Cu,Al phosphor core was packed in a silica boat and set into a quartz tube in a tubular synthesis furnace. After a complete replacement with Ar gas, the sulfurating treatment was carried out in hydrogen sulfide atmosphere by flowing $H_2S$ gas at 200 ml/min into the quartz tube. The firing temperature was controlled to be 400° C. and the firing time a half hour. After crushing lightly the sulfurating treatment product, it was sieved to obtain the sulfurating treatment phosphor used for the present invention. Thermal glow curves of sulfurating treatment phosphors are shown in FIGS. 1 and 2. The concentration of vacancies relating to sulfur spread in a wide region from 350-600K observed in the phosphor core was reduced by the sulfurating treatment. TABLE 1 shows the thermoluminescent intensities of the phosphor core and the sulfurating treatment product of samples 1 and 2 at 350K and 450K. In the sample 1 phosphor core, the thermoluminescent intensity ratio at 350K and 450K (thermoluminescent intensity at 450K/thermoluminescent intensity at 350K) is 41%, but the value for the sample 1 sulfurating treatment product is decreased to 15%.

Moreover, likewise in sample 2, the thermoluminescent intensity ratio of 27% in the sample 2 phosphor core is decreased to 14% in the sample 2 sulfurating treatment product. The thermoluminescent intensity at 450K relating to sulfur vacancies due to the sulfurating treatment is reduced to 20% of the thermoluminescent intensity at 350 K. Additionally, the thermal glow curves of both samples 1 and 2 sulfurating treatment products at 420-550K are flat and no peaks or steps due to sulfur vacancies can be observed. TABLE 2 shows the relative change in the thermoluminescent intensity at 550K and the thermoluminescent intensity at 420K. About a 30% change is observed in the phosphor cores of samples 1 and 2. On the other hand, the change in thermoluminescent intensity can almost not be observed in the sulfurating treatment products, and the thermal glow curve is flat. The thermoluminescent intensity caused by sulfur vacancies was reduced by the sulfurating treatment of the present invention. It has been shown that the sulfur vacancy concentration of sulfurating treatment products was reduced compared with the phosphor core.

TABLE 1

Thermoluminescent intensity ratios of ZnS:Cu,Al phosphors

| Samples | Thermoluminescent intensity (a.u.) | | Thermoluminescent intensity ratio |
|---|---|---|---|
| | 350K | 450K | |
| Sample 1 phosphor core | 0.085 | 0.035 | 41% |
| Sample 1 sulfurating treatment product | 0.117 | 0.018 | 15% |
| Sample 2 phosphor core | 0.127 | 0.034 | 27% |
| Sample 2 sulfurating treatment product | 0.156 | 0.022 | 14% |

TABLE 2

Relative change in the thermoluminescent intensity of ZnS:Cu,Al Phosphors

| Samples | Thermoluminescent intensity (a.u.) | | Relative change in thermoluminescent intensity ratio |
|---|---|---|---|
| | 420K | 550K | |
| Sample 1 phosphor core | 0.027 | 0.036 | +33% |
| Sample 1 sulfurating treatment product | 0.021 | 0.021 | 0% |
| Sample 2 phosphor core | 0.037 | 0.026 | −30% |
| Sample 2 sulfurating treatment product | 0.022 | 0.022 | 0% |

Figure 3:
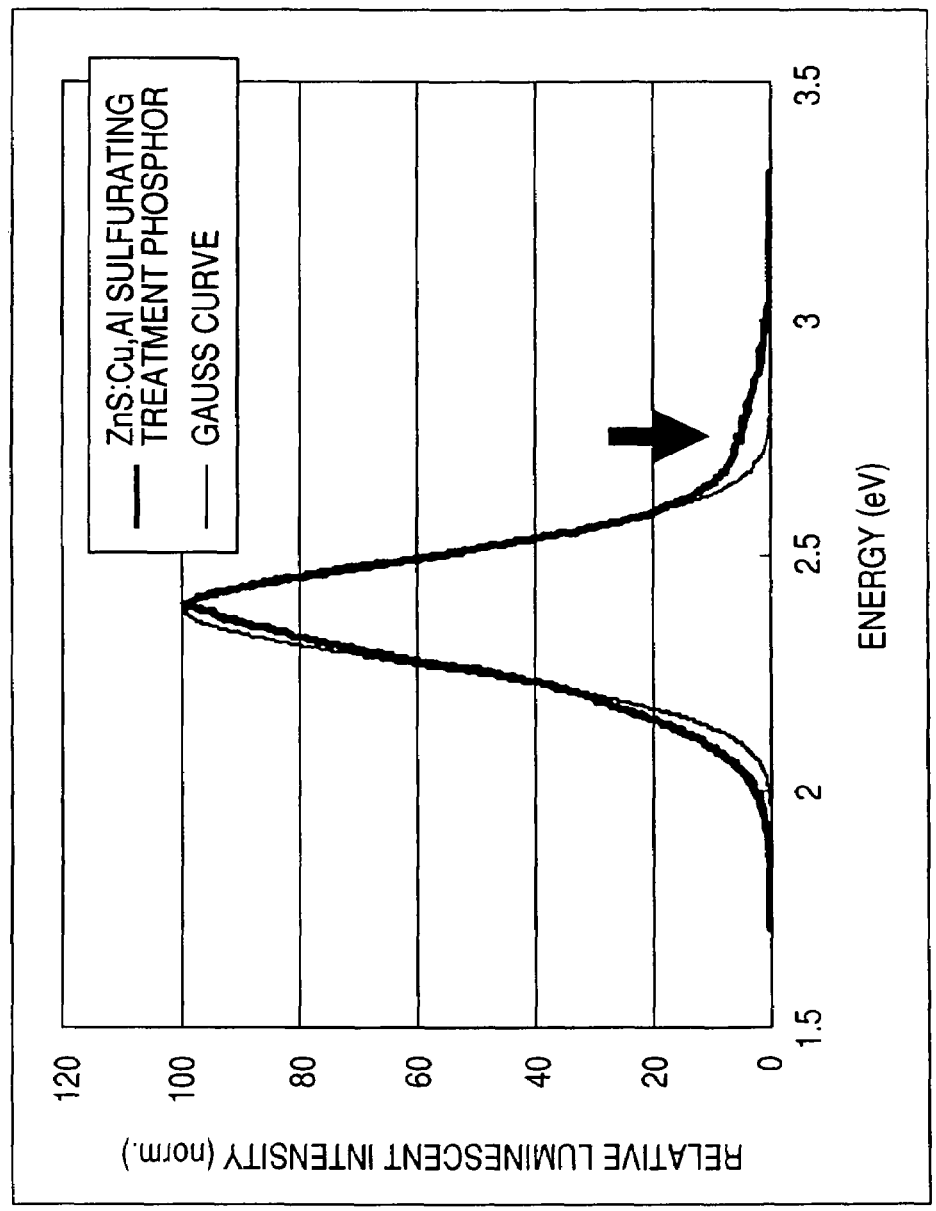
FIG. 3 is a graph showing the electron beam excitation cathode-luminescence spectrum of ZnS:Cu,Al phosphors of the present invention.

Next, the measurement of the electron-beam excitation cathode-luminescence spectrum of a phosphor of the present invention was evaluated. FIG. 3 shows the cathode-luminescence spectrum of a ZnS:Cu,Al phosphor of the present invention. The sample temperature was controlled to be 20° C. The peak of the cathode-luminescence spectrum was at 518 nm (2.39 eV), and a shoulder was observed at 450 nm (2.76 eV), which was on the short wavelength side of the peak. Then, a calculation was carried out fitting this curve to a Gaussian curve. In the fitting calculation, the energy was taken as the horizontal axis, and the calculation was done to fit the curve of the higher energy side than the peak. The results are shown in FIG. 3. The cathode-luminescence spectrum of the phosphor of the present invention was 5.2 at 2.76 eV when the peak intensity is 100, and the value is 9.4 times greater than the value (0.55) at 2.76 eV in the Gaussian curve.

Figure 4:
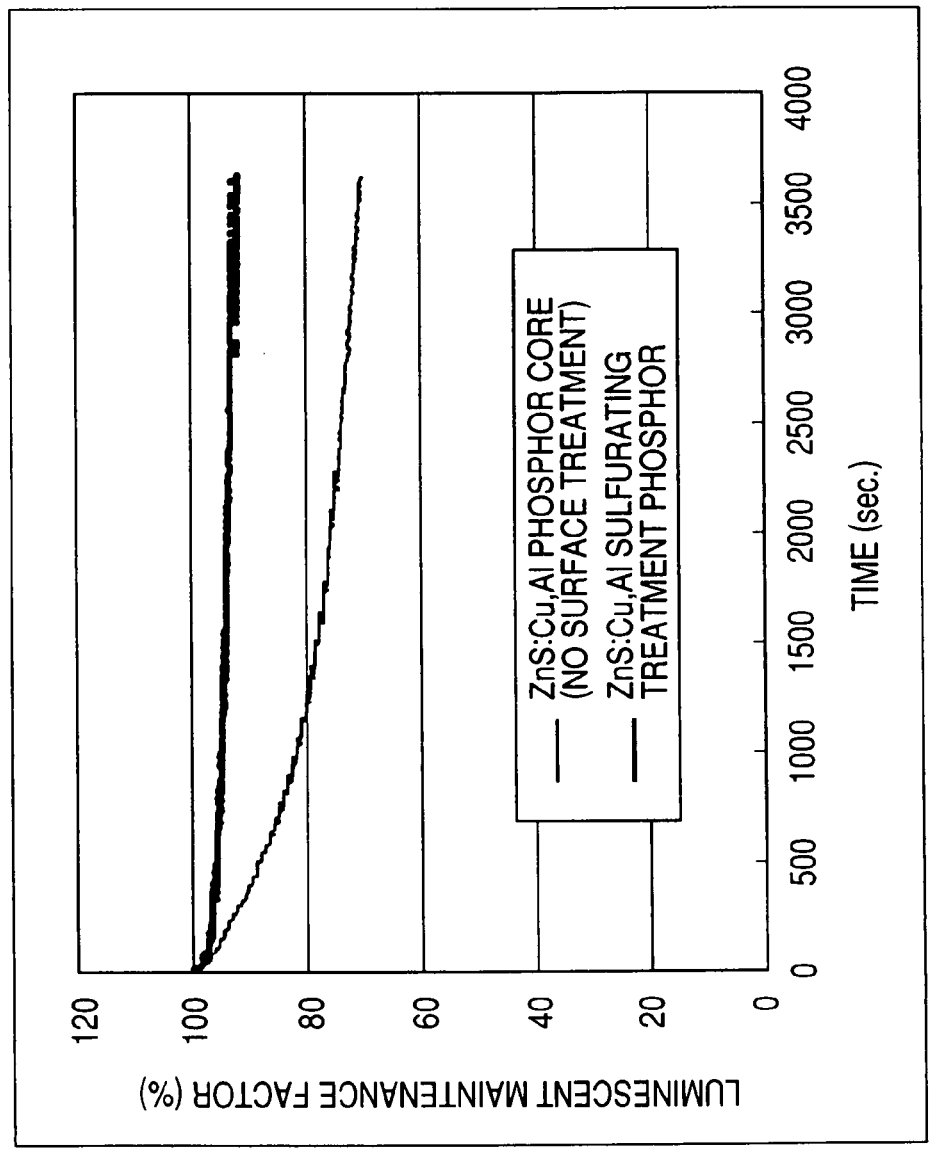
FIG. 4 is a graph showing the luminescent maintenance factor curves of ZnS:Cu,Al phosphors of the present invention.

Next, the luminescent maintenance factor of the phosphor core and sulfurating treatment phosphor was measured using demountable equipment. The measurement sample was prepared by forming a phosphor layer by the sedimentation method on a Ni-plated Cu substrate, the same as the thermal glow curve measurement. The applied weight was 2-5 mg/cm$^2$. The electron beam in the demountable equipment is scanned by a deflecting yoke from left to right and top to bottom with the same frequency as a regular television, thereby a square raster (electron beam irradiation area) was drawn in a certain area on the phosphor layer manufactured in the aforementioned way. The luminescence brightness and energy efficiency were measured by a Si photocell from the side irradiating the electron beam (the opposite side) through the filter for color correction. Additionally, the brightness and chromaticity were measured by a color-difference meter at the same time as the measurement using the Si photocell from the side irradiating the electron beam (the opposite side). The accelerated test for evaluating the luminescent maintenance factor was carried out under the condition of an accelerating voltage of 1-30 kV, irradiation area of 8×8 mm$^2$, irradiation current of 100 μA, irradiation time of 60 min, and sample temperature of 200° C. As a result, the brightness of the ZnS:Cu,Al phosphor core after the accelerated test at an accelerating voltage of 5 kV (irradiation current 2-10 μA) decreased to the luminescent maintenance factor of 60% compared with the initial brightness, as shown in TABLE 3. On the other hand, the luminescent maintenance factor of the sulfurating treatment phosphor was 87% after the accelerated test, which was an improvement of 27% compared with the phosphor core. The luminescent maintenance factor curve during the accelerated test is shown in FIG. 4. It follows that degradation of a sulfurating treatment phosphor is better than that of a phosphor core, and the progress of deterioration is controlled while the luminescent maintenance factor of the phosphor core decreases with the time.

Figure 5:
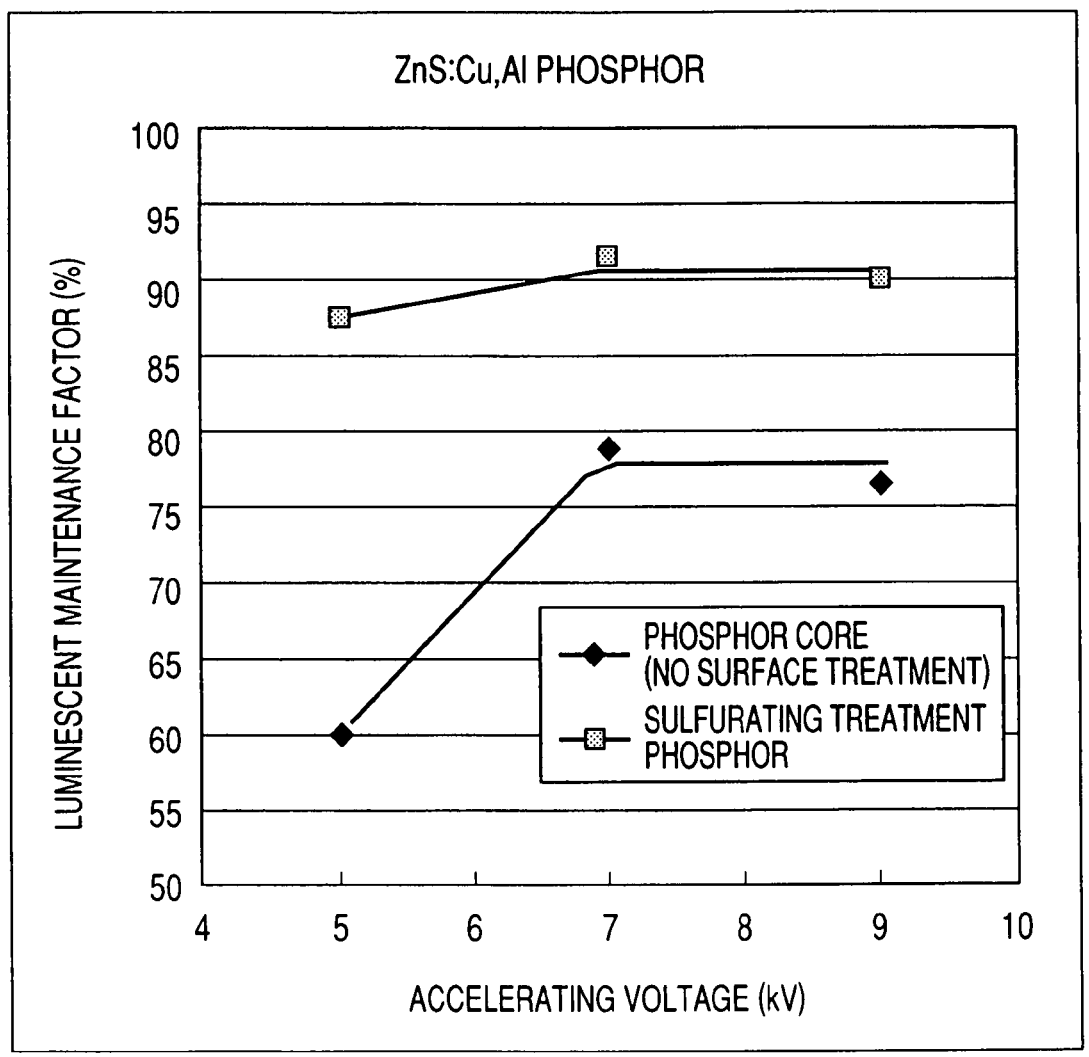
FIG. 5 is a graph showing the relation between luminescent maintenance factor and accelerating voltage of ZnS:Cu,Al phosphors of the present invention.

FIG. 5 and TABLE 3 show the accelerating voltage dependence of the luminescent maintenance factor of the phosphor core and sulfurating treatment product. The accelerating test was carried out by changing only one condition, the accelerating voltage, in the evaluation of the luminescent maintenance factor, while the other conditions were controlled to be same as those mentioned above. The luminescent maintenance factors of the phosphor core at the accelerating voltages of 9 kV and 7 kV have almost the same values, 77% and 79%, respectively. However, at an accelerating voltage of 5 kV, there is a tendency that the luminescent maintenance factor rapidly decreases to 60%. The luminescent maintenance factors of the phosphor core decrease 17% by decreasing the accelerating voltage from 9 kV to 5 kV. On the other hand, the reduction of luminescent maintenance factors of the sulfurating treatment product is only 3%, and the degree of improvement of luminescent maintenance factors is greater at a low accelerating voltage. Because the electron beam reaches only the surface layer of the phosphor in the case of a low accelerating voltage, the electron density per volume is large, thereby deterioration in the surface layer easily occurs. The luminescent maintenance factor at a low accelerating voltage was drastically improved by a reduction in the amount of sulfur vacancies in the surface layer caused by the sulfurating treatment.

TABLE 3

Accelerating voltage dependence of the luminescent maintenance factor of ZnS:Cu,Al phosphors

| | Accelerating voltage | | |
|---|---|---|---|
| | 5 kV | 7 kV | 9 kV |
| Phosphor core | 60% | 79% | 77% |
| Sulfurating treatment phosphor | 87% | 92% | 90% |
| Degree of improvement | +27% | +13% | +13% |

Next, the luminescent brightness of the phosphor core and sulfurating treatment phosphor were compared. The luminescent brightness was evaluated using demountable equipment in a manner similar to the measurement of the luminescent maintenance factor. The luminescent brightness of the sulfurating treatment phosphor was almost the same as that of the phosphor core under the conditions of an accelerating voltage of 1-15 kV, an irradiation area of 8×8 mm$^2$, an irradiation current of 10 μA, and room temperature.

Second Embodiment

The ZnS:Ag,Al phosphor core, a raw material reducing the sulfur vacancies at the surface by a sulfurating treatment of the present invention, can be produced by the following method. Ag used for an activator was made by dissolving AgNO$_3$ into pure water to make a 10$^{-4}$ mol/ml solution, and a predetermined amount of the solution was added. The other materials are the same as those described in the first embodiment. In the case of ZnS:Ag,Al phosphor (Ag=500 ppm by weight, Al=200 ppm by weight), the amount of each raw material is as follows:

| Zinc sulfide raw powder | ZnS | 9.746 g |
| Ag solution | Ag | 0.451 ml |
| Al solution | Al | 0.722 ml |

The phosphor core used in the present invention was obtained using the above-mentioned materials by firing and post-processing in the same way as the first embodiment. The ZnS:Ag,Al phosphor was subjected to a sulfurating treatment in the same way as the first embodiment. Sulfur vacancies were observed in the thermal glow curve of the phosphor core. The sulfur vacancies were reduced by the sulfurating treatment, and luminescent maintenance factor characteristics of the sulfurating treatment phosphor were improved as in the case of the first embodiment.

Figure 6:
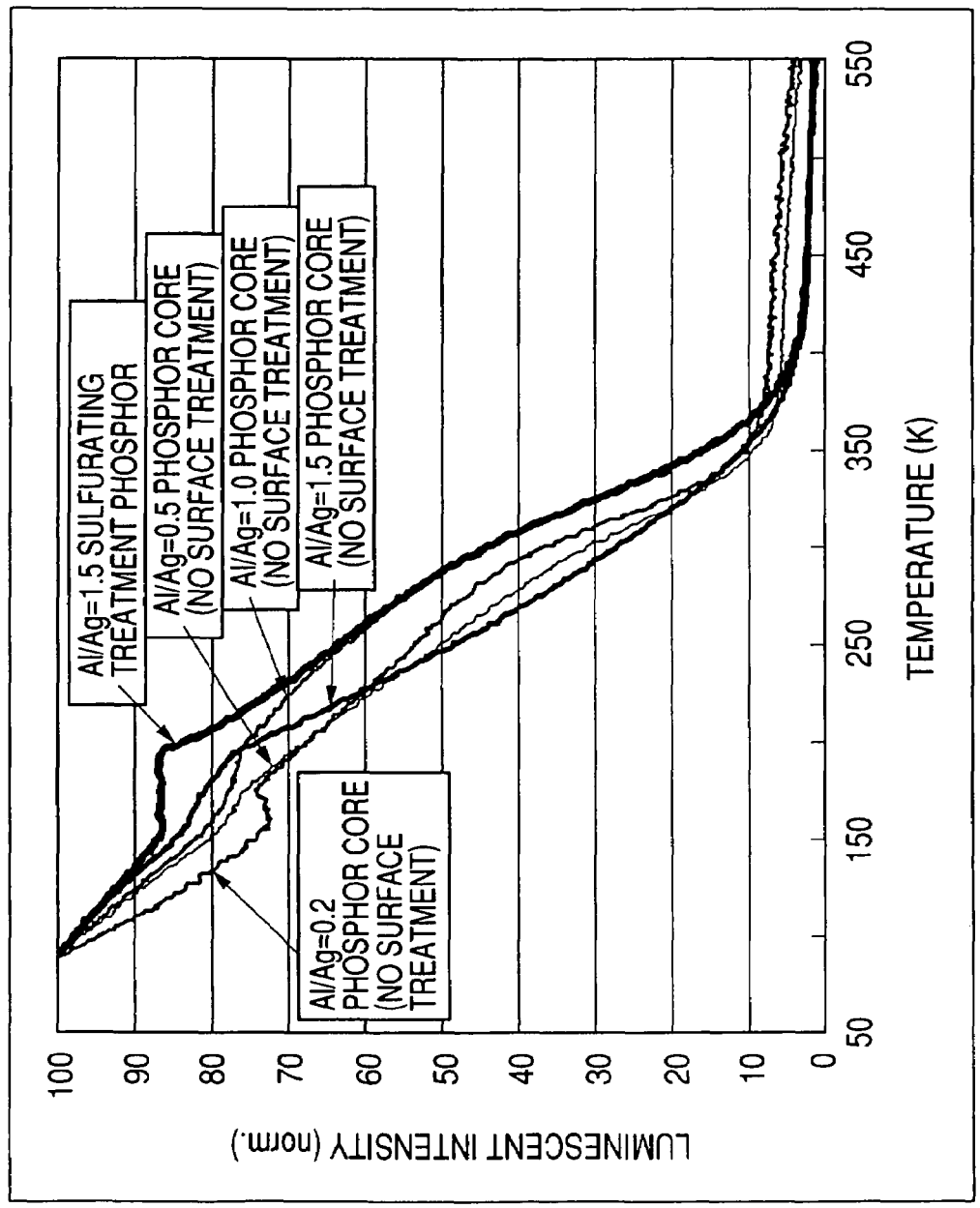
FIG. 6 is a graph showing the temperature dependences of ZnS:Ag,Al phosphors of the present invention.

Next, the temperature characteristics of the ZnS:Ag,Al phosphor core were determined. The measurement sample was prepared by forming a phosphor layer on a Ni-plated Cu substrate by a sedimentation method. The measurement sample was set into a vacuum chamber, drawn under vacuum, and then cooled to about 80K using liquid nitrogen. After irradiating the sample with ultraviolet rays (168 nm) for 45 minutes using a deuterium lamp as an excitation light, the heater was turned on. Five minutes later, the measurement started when the temperature of the sample reached 90K. The heating rate was controlled to be 0.1 K/sec this time. Thus, the temperature of the sample was raised linearly with irradiating vacuum-ultraviolet rays and the generated luminescence of the phosphor was detected by a photomultiplier. This signal was recorded by a computer through an amplifier. FIG. 6 shows the temperature characteristics in the case of an Al/Ag mole ratio of 0.2, 0.5, 1.0, and 1.5. In the case when the Al/Ag mole ratio is 0.2 and the Ag concentration is higher than Al concentration, a shoulder is observed from 150K to about 180K. With increasing Al concentration, which means increasing Al/Ag mole ratio, this shoulder becomes broader. The temperature characteristics of a phosphor of the present invention in the case of an Al/Ag mole ratio of 1.5 are also shown in FIG. 6.

Figure 7:
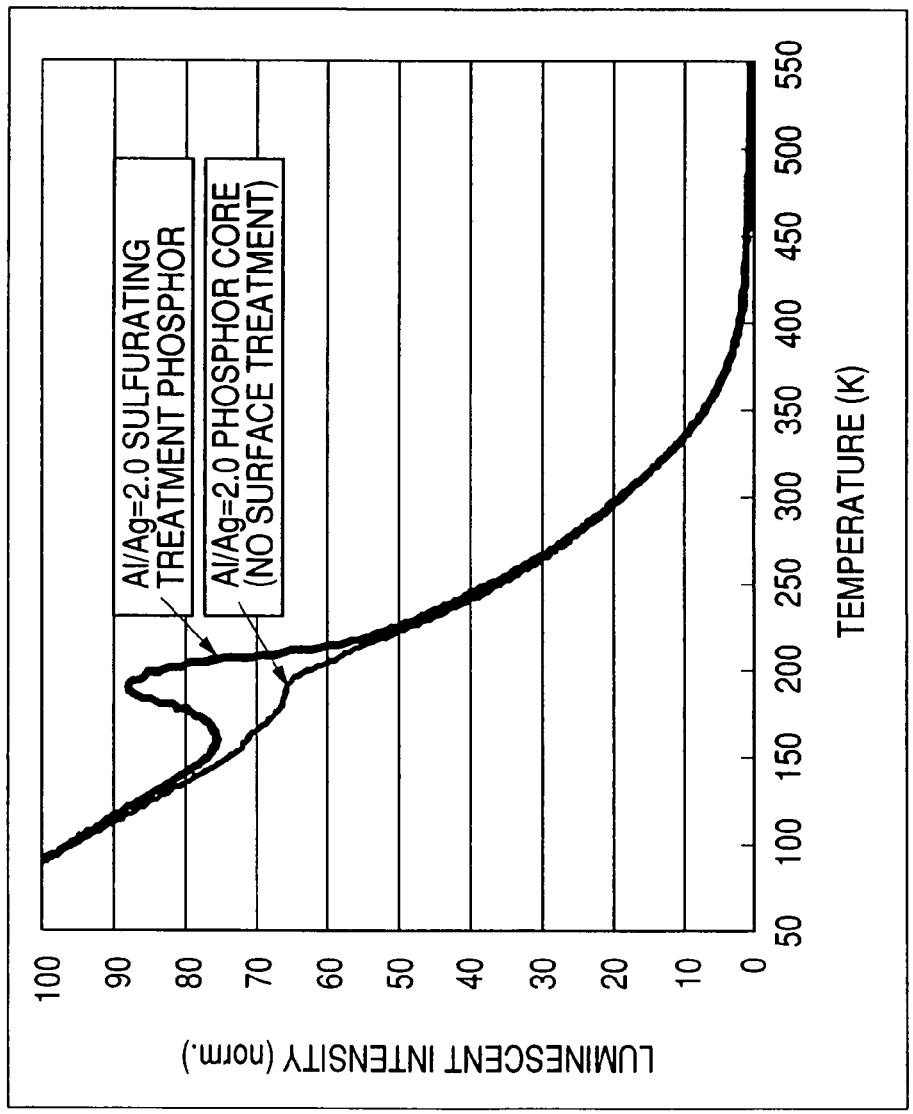
FIG. 7 is a graph showing the temperature dependences of ZnS:Ag,Al phosphors of the present invention.

A large shoulder is observed from 150K to 200K in the temperature characteristics of the phosphor of the present invention, which is similar to the case of an Al/Ag mole ratio of 0.2. In FIG. 6, the luminescent intensity of a phosphor of the present invention at 195K keeps 95% or more of the luminescence intensity at 155K. The vacuum-ultraviolet rays penetrate only up to about 0.1 μm of the top surface of the phosphor. The temperature characteristics of the phosphor of the present invention being similar to those of an Al/Ag mole ratio of 0.2 indicates that the Al/Ag mole ratio of the top surface decreases from 1.5 to 0.5 or less. FIG. 7 shows the temperature characteristics of a phosphor core and a phosphor of the present invention having the Al/Ag mole ratio of 2.0. It is observed that a phosphor of the present invention has a peak at around 190K in the temperature characteristics. In FIGS. 6 and 7, the shoulder and the peak at around 190K in the temperature characteristics relate to the decrease of the Al/Ag mole ratio at the phosphor surface.

Figure 8:
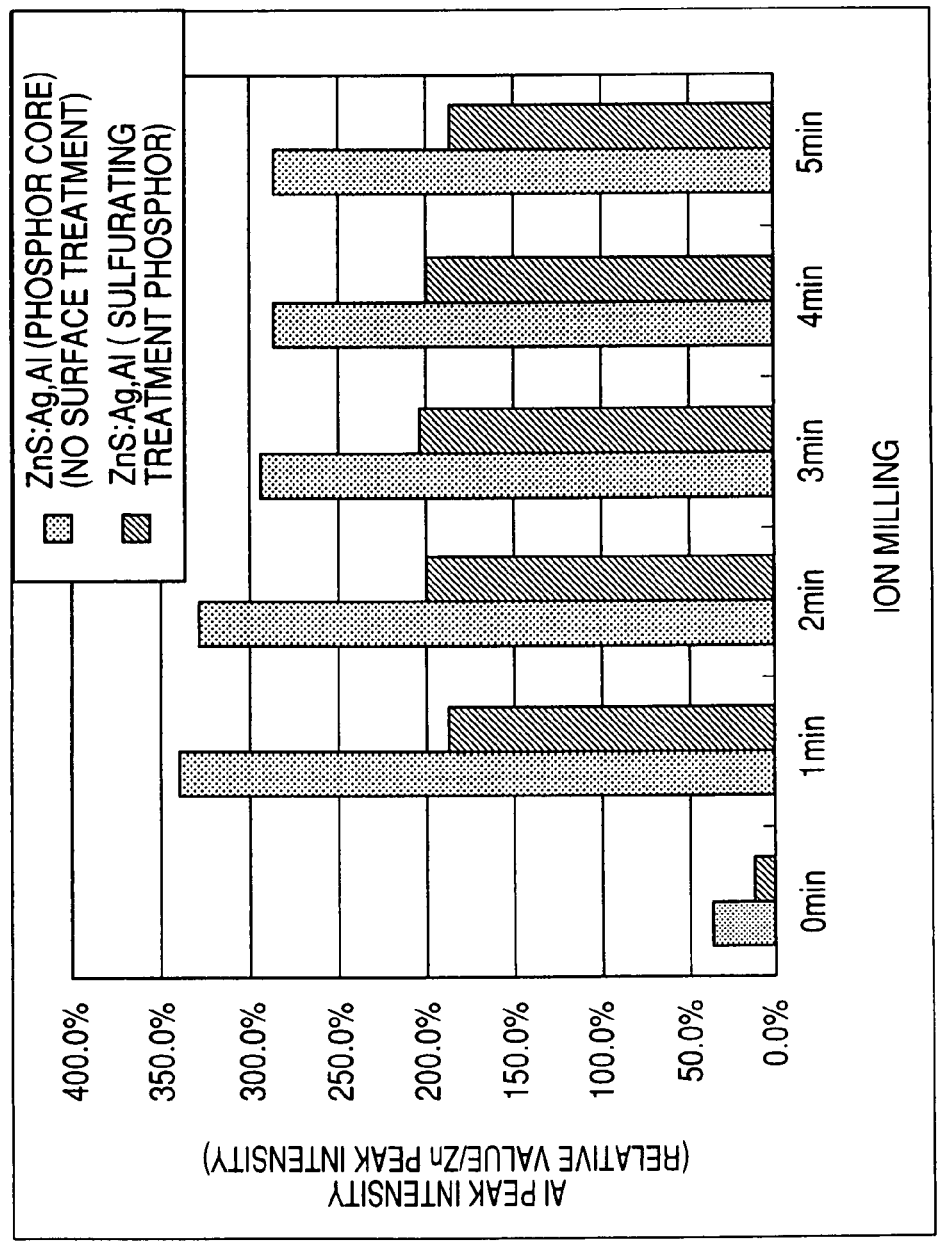
FIG. 8 is a graph showing the relation between relative Al peak intensity and ion milling time according to TOF-SIMS analyses of ZnS:Ag,Al phosphors of the present invention.

Next, surface analysis of the ZnS;Ag,Al phosphor was carried out using time of flight-secondary ion mass spectrometry (TOF-SIMS). FIG. 8 shows the ion milling time dependence of the relative values of a phosphor core and a phosphor of the present invention, in which the second ion peak intensity of Al is divided by the second ion peak of Zn. Because of the sulfurating treatment, the Al peak intensity decreases and the Al concentration at the phosphor surface decreases compared with the phosphor core. These results are the same as the temperature characteristics evaluation results described above. Additionally, the distribution of the Al peak intensity (((maximum value/minimum value)−1)×100(%)) with an ion milling time of 1 min-5 min is 30% in the phosphor core. On the other hand, the distribution is 9% in a phosphor of the present invention, which means that the distribution of the Al concentration becomes uniform. The distribution of the Al concentration is likewise preferably 10% or less. This is caused by enhanced diffusion of added elements in the phosphor of the present invention. Moreover, in the case when the Al concentration was relatively small, the distribution in the sulfurating treatment product became even smaller to 4%.

Figure 9:
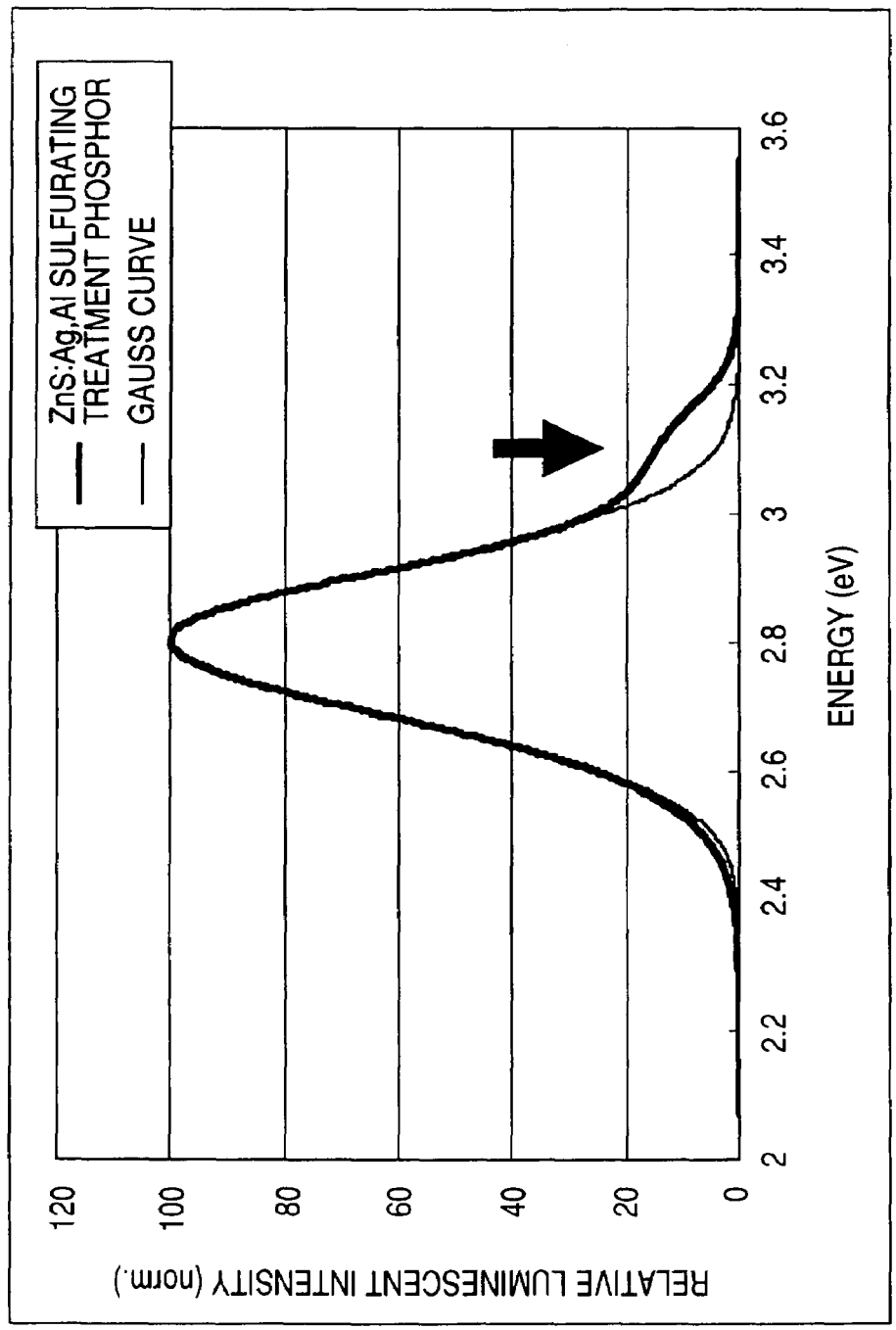
FIG. 9 is a graph showing the electron beam excitation cathode-luminescence spectrum of a ZnS:Ag,Al phosphor of the present invention.

Next, the electron-beam excitation cathode-luminescence spectrum of ZnS:Ag,Al phosphor was measured. FIG. 9 shows the cathode-luminescence spectrum of a ZnS:Ag,Al phosphor of the present invention. The sample temperature was controlled to be −190° C. The peak of the cathode-luminescence spectrum was at 445 nm (2.79 eV), and a shoulder was observed at 400 nm (3.10 eV), which was on the short wavelength side of the peak. Then, a calculation was carried out fitting this curve to a Gaussian curve of the cathode-luminescence spectrum. In the fitting calculation, the energy was taken as the horizontal axis, and the calculation was done to fit the curve on the higher energy side of the peak. The results are shown in FIG. 9. The cathode-luminescence spectrum of the phosphor of the present invention was 14.5 at 3.10 eV when the peak intensity was 100, and the value was 3.7 times greater than the value (3.9) at 3.10 eV in the Gaussian curve.

Figure 10:
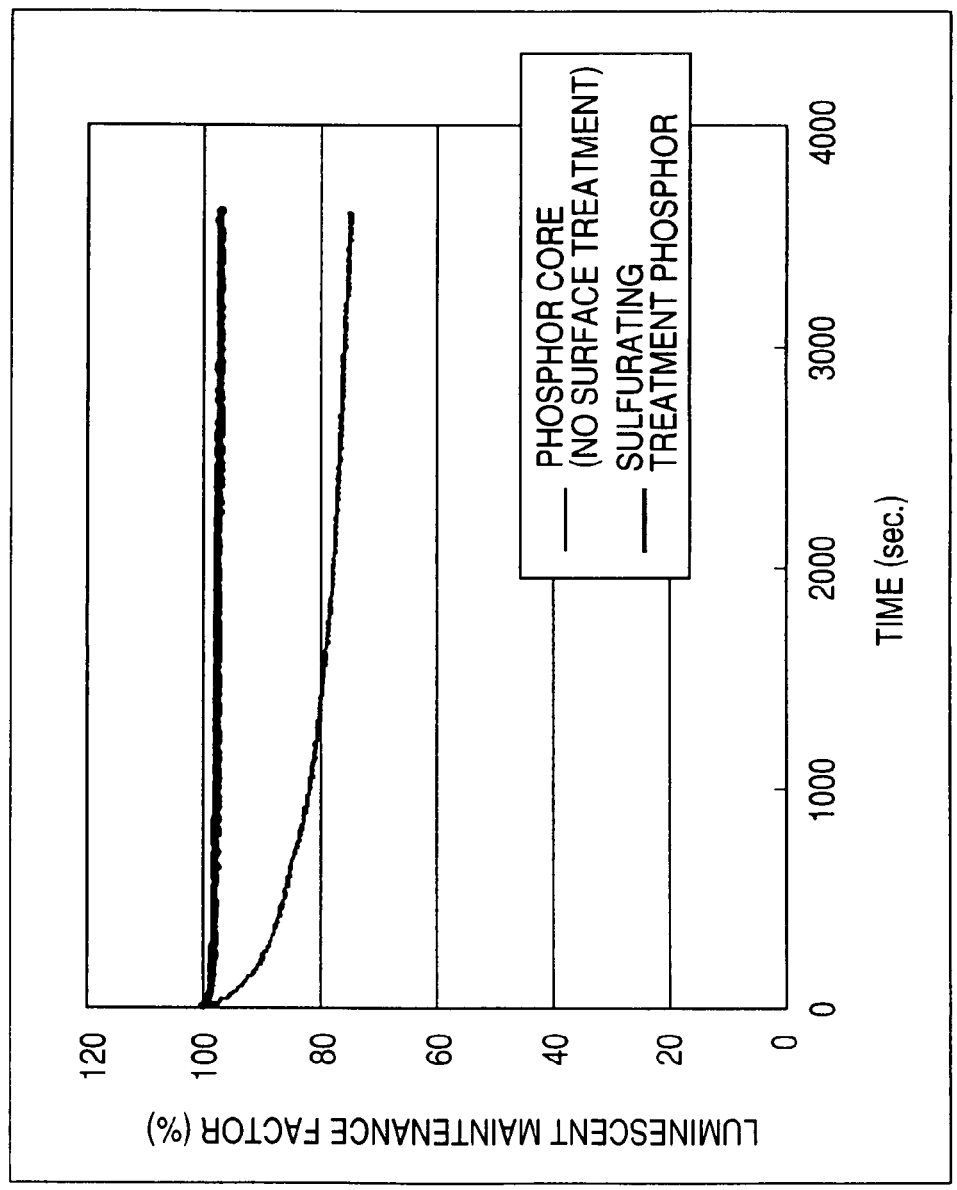
FIG. 10 is a graph showing the luminescent maintenance factor curves of ZnS:Ag,Al phosphors of the present invention.

Next, the luminescent maintenance factor of a ZnS:Ag,Al phosphor was measured. FIG. 10 shows the luminescent maintenance factor curve during an accelerating test. It follows that degradation of a phosphor of the present invention is better than that of a phosphor core, and the progress of deterioration is controlled while the luminescent maintenance factor of the phosphor core decreases with the time.

Next, the luminescent brightness of a phosphor core and sulfurating treatment phosphor were compared. The luminescent brightness was evaluated using demountable equipment in a manner similar to the measurement of the luminescent maintenance factor. The luminescent brightness of the sulfurating treatment phosphor was the same as that of the phosphor core under the conditions of an accelerating voltage of 1-15 kV, an irradiation area of 8×8 $mm^2$, an irradiation current of 10 μA, and room temperature.

Third Embodiment

The sulfurating treatment described in the present invention was carried out for ZnS:Ag,Cl, the same as the first embodiment. The ZnS:Ag,Cl phosphor core used was a commercial product The sulfur vacancies decreased due to the sulfurating treatment, and the luminescent maintenance factor characteristics were improved, the same as the first embodiment.

Figure 11:
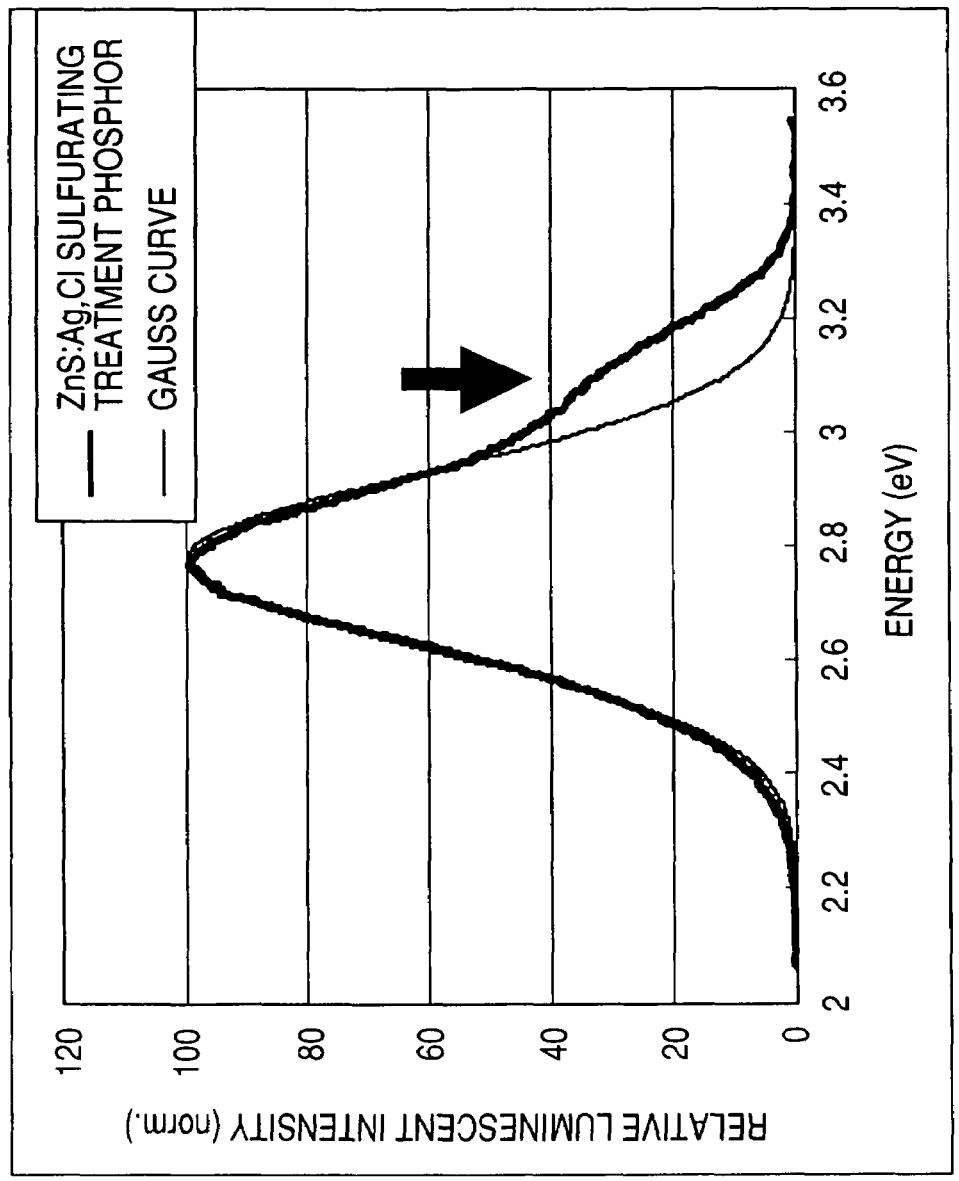
FIG. 11 is a graph showing the electron beam excitation cathode-luminescence spectrum of a ZnS:Ag,Cl phosphor of the present invention.

Next, the electron-beam excitation cathode-luminescence spectrum of ZnS:Ag,Cl phosphor was measured. FIG. 11 shows the cathode-luminescence spectrum of a ZnS:Ag,Cl phosphor of the present invention. The sample temperature was controlled to be 20° C. The peak of the cathode-luminescence spectrum was at 448 nm (2.77 eV), and a shoulder was observed at 400 nm (3.10 eV), which was on the short wavelength side of the peak. Then, a calculation was carried out fitting this curve to a Gaussian curve of the cathode-luminescence spectrum. In the fitting calculation, the energy was taken as the horizontal axis, and the calculation was done to fit the curve on the higher energy side of the peak. The results are shown in FIG. 11. The cathode-luminescence spectrum intensity of the phosphor of the present invention was 32.0 at 3.10 eV when the peak intensity was 100, and the value was 2.9 times greater than the value (11.2) at 3.10 eV in the Gaussian curve.

Next, elements other than the ones detected by TOF-SIMS analysis were measured. As a result, alkali earth metal (group IIa), alkali metal (group Ia), and halogen elements (group VIIb) such as Ca, Sr, Na, K, F, Br, Si, C, and O were detected in addition to Zn, S, Ag, and Cl, which were mixed as the raw materials. Alkali earth metals are elements which were minute contaminants in the ZnS raw material. Additionally, alkali metals and halogen elements are the traces which were mixed with the raw materials as a flux. Moreover, C and O are absorbed on the phosphor surface as impurities. Furthermore, Si is contaminated on the surface because it is used as a post-treatment material. Thus, the phosphor is contaminated with trace elements other than the raw materials. Furthermore, in order to improve the luminescent maintenance factor, luminescent efficiency, and chromaticity, there is a means whereby rare earth elements such as Tm, Ce, Eu, and Tb are added into the raw materials.

Next, the luminescent brightness of a phosphor core and a sulfurating treatment phosphor were compared. The luminescent brightness was evaluated using demountable equipment in a manner similar to the measurement of the luminescent maintenance factor. The luminescent brightness of the sulfurating treatment phosphor was the same as that of the phosphor core under the conditions of an accelerating voltage of 1-15 kV, an irradiation area of 8×8 $mm^2$, an irradiation current of 10 μA, and room temperature.

Fourth Embodiment

A sulfurating treatment ZnS:Cu,Au,Al phosphor of the present invention can be manufactured as follows. The ZnS:Cu,Au,Cl phosphor used for the phosphor core was a commercial product. The sulfurating treatment was carried out the same as the first embodiment. As a result, the brightness of the phosphor core after the accelerating test decreased to a luminescent maintenance factor of 75% compared with the initial brightness. On the other hand, the luminescent maintenance factor of the sulfurating treatment phosphor was 90% after the accelerating test, which was an improvement of 15% compared with the phosphor core.

Fifth Embodiment

The sulfurating treatment $Y_2O_2S$:Eu phosphor of the present invention was manufactured as follows. The P22 red $Y_2O_2S$:Eu phosphor used for the phosphor core was a commercial product. The sulfurating treatment was carried out the same as the first embodiment. As a result, the brightness of the phosphor core after the accelerating test decreased to a luminescent maintenance factor of 93% compared with the initial brightness. On the other hand, the luminescent maintenance factor of the sulfurating treatment phosphor was 98% after the accelerating test, which was an improvement of 5% compared with the phosphor core.

Sixth Embodiment

The sulfurating treatment of the present invention is accomplished by an evaporation method. Solid state sulfur was used as a sulfur supply source and evaporated by heating, and then the sulfur vapor generated was supplied into a reaction chamber. The reaction chamber was a quartz tube surrounded by an infrared furnace, and a ZnS:Cu,Al phosphor core was set into the quartz tube. The reaction chamber is designed to rotate, thereby, the phosphor core in the quartz tube can be exposed to sulfur vapor uniformly. In this way, the sulfurating treatment was applied at a treatment temperature of 400° C. After the sulfurating treatment phosphor was crushed lightly, it was sieved to obtain the sulfurating treatment phosphor used for the present invention. Sulfur vacancies in the ZnS:Cu,Al phosphor were decreased by the sulfurating treatment and the luminescent maintenance factor characteristics of the sulfurating treatment phosphor were improved, the as same as the first embodiment, although sulfur vacancies were observed in the thermal glow curve of the phosphor core, the same as the first embodiment.

Seventh Embodiment

10% $H_2S/H_2$ gas was used as a sulfur supply source, and the flow-rate controlled gas was supplied into a reaction chamber. The reaction chamber is a quartz tube surrounded by an infrared furnace, and a ZnS:Ag,Al phosphor core is set into the quartz tube. The reaction chamber is designed to rotate, thereby, the phosphor core in the quartz tube can be exposed to sulfur vapor uniformly. In this way, the sulfurating treatment was applied at a treatment temperature of 300° C. After the sulfurating treatment phosphor was crushed lightly, and it was sieved to obtain the sulfurating treatment phosphor used for the present invention. Sulfur vacancies in the ZnS:Ag,Al phosphor were decreased by the sulfurating treatment and the luminescent maintenance factor characteristics of the sulfurating treatment phosphor were improved, the same as the first embodiment, although sulfur vacancies were observed in the thermal glow curve of the phosphor core, the same as the first embodiment.

Eighth Embodiment

Carbon dioxide was used as a sulfur supply source, and the flow-rate controlled gas was supplied into a reaction chamber. The reaction chamber was a quartz tube surrounded by an infrared furnace, and a ZnS:Ag,Cl phosphor core was set into the quartz tube. The reaction chamber is designed to rotate, thereby, the phosphor core in the quartz tube can be exposed to sulfur vapor uniformly. In this way, the sulfurating treatment was applied at a treatment temperature of 100° C. After the sulfurating treatment phosphor was crushed lightly, it was sieved to obtain the sulfurating treatment phosphor used for the present invention. Sulfur vacancies in the ZnS:Ag,Cl phosphor were decreased by the sulfurating treatment, and the luminescent maintenance factor characteristics of the sulfurating treatment phosphor were improved, the as same as the first embodiment, although sulfur vacancies were observed in the thermal glow curve of the phosphor core, the same as the first embodiment.

Ninth Embodiment

Solid state sulfur powder was used as a sulfur supply source. The reaction chamber was a quartz tube surrounded by an infrared furnace, and a ZnS:Cu,Al phosphor core and the solid state sulfur powder were introduced into the quartz tube. The reaction chamber is designed to rotate, thereby, the phosphor core in the quartz tube can be exposed to sulfur vapor uniformly. In this way, the sulfurating treatment was applied at a treatment temperature of 500° C. After the sulfurating treatment phosphor was crushed lightly, it was sieved to obtain the sulfurating treatment phosphor used for the present invention. Sulfur vacancies in the ZnS:Cu,Al phosphor were decreased by the sulfurating treatment and the luminescent maintenance factor characteristics of the sulfurating treatment phosphor were improved, the same as the first embodiment, although sulfur vacancies were observed in the thermal glow curve of the phosphor core, the same as the first embodiment.

Tenth Embodiment

10% $H_2S/H_2$ gas was used as a sulfur supply source, and the flow-rate controlled gas was supplied into a reaction chamber. The reaction chamber is a quartz tube surrounded by an infrared furnace, and the ZnS:Ag, Al phosphor core and the solid state sulfur powder are set inside the quartz tube. The reaction chamber is designed to rotate, thereby, the phosphor core in the quartz tube can be exposed to sulfur vapor uniformly. In this way, the sulfurating treatment was applied at a treatment temperature of 600° C. After the sulfurating treatment phosphor was crushed lightly, it was sieved to obtain the sulfurating treatment phosphor used for the present invention. Sulfur vacancies of the ZnS:Ag,Al phosphor were decreased by the sulfurating treatment and the luminescent maintenance factor characteristics of the sulfurating treatment phosphor were improved, the same as the first embodiment, although sulfur vacancies were observed in the thermal glow curve of the phosphor core, the same as the first embodiment.

Eleventh Embodiment

A sulfurating treatment of the present invention can be accomplished by annealing a phosphor core mixed with solid state sulfur powder. The ZnS:Cu,Al phosphor core mixed with the solid state sulfur powder was packed in a silica boat and set into a quartz tube in a tubular synthesis furnace. After a complete purge with Ar gas, it was annealed at a treatment temperature of 400° C. for one hour. After crushing lightly the sulfurating treatment product, it was sieved to obtain the sulfurating treatment phosphor used for the present invention. Sulfur vacancies of the ZnS:Cu,Al phosphor were decreased by the sulfurating treatment and the luminescent maintenance factor characteristics of the sulfurating treatment phosphor were improved, the same as the first embodiment, although sulfur vacancies were observed in the thermal glow curve of the phosphor core, the same as the first embodiment.

Twelfth Embodiment

A sulfurating treatment of the present invention is accomplished by annealing a phosphor core in a way whereby solid state sulfur is placed around a phosphor core. The ZnS:Cu,Al phosphor core was packed in a silica boat while the solid state sulfur was placed in a silica boat one size larger, and set into a quartz tube in a tubular synthesis furnace. After a complete purge with Ar gas, it was annealed at a treatment temperature of 300° C. for one hour. After crushing lightly the sulfurating treatment product, it was sieved to obtain the sulfurating treatment phosphor used for the present invention. Sulfur vacancies of the ZnS:Cu,Al phosphor were decreased by the sulfurating treatment and the luminescent maintenance factor characteristics of the sulfurating treatment phosphor were improved, the same as the first embodiment, although sulfur vacancies were observed in the thermal glow curve of the phosphor core, the same as the first embodiment.

Thirteenth Embodiment

A sulfurating treatment of the present invention can be accomplished by annealing a phosphor core in a 10% $H_2S/H_2$ gas atmosphere. The ZnS:Ag,Al phosphor core was packed in a silica boat, the reaction chamber is completely purged with Ar, and then a 10% $H_2S/H_2$ gas was supplied into a quartz tube in a tubular synthesis furnace while controlling the flow rate. It was annealed at a treatment temperature of 400° C. for one hour. After crushing lightly the sulfurating treatment phosphor, it was sieved to obtain the sulfurating treatment phosphor used for the present invention. Sulfur vacancies of the ZnS:Ag, Al phosphor were decreased by the sulfurating treatment, and the luminescent maintenance factor characteristics of the sulfurating treatment phosphor were improved, the same as the first embodiment, although sulfur vacancies were observed in the thermal glow curve of the phosphor core, the same as the first embodiment.

Fourteenth Embodiment

A sulfurating treatment of the present invention can be accomplished by annealing a phosphor core in a carbon dioxide atmosphere. The ZnS:Cu,Au,Al phosphor core was packed in a silica boat, the reaction chamber was completely purged with Ar, and then carbon dioxide gas was supplied into a quartz tube in a tubular synthesis furnace while controlling the flow rate. It was annealed at a treatment temperature of 200° C. for one hour. After crushing lightly the sulfurating treatment phosphor, it was sieved to obtain the sulfurating treatment phosphor used for the present invention. Sulfur vacancies of the ZnS:Cu, Au, Al phosphor were decreased by the sulfurating treatment and the luminescent maintenance factor characteristics of the sulfurating treatment phosphor were improved, the same as the first embodiment, although sulfur vacancies were observed in the thermal glow curve of the phosphor core, the same as the first embodiment.

Fifteenth Embodiment

A sulfurating treatment of the present invention can be accomplished by mixing a phosphor core with solid state sulfur powder and annealing a phosphor core in a 10% $H_2S/H_2$ gas atmosphere. The ZnS:Ag, Al phosphor core and solid state sulfur powder were packed in a silica boat, the reaction chamber is completely purged with Ar, and then a 10% $H_2S/H_2$ gas was supplied into a quartz tube in a tubular synthesis furnace while controlling the flow rate. It was annealed at the treatment temperature of 400° C. for one hour. After crushing lightly the sulfurating treatment phosphor, it was sieved to obtain the sulfurating treatment phosphor used for the present invention. Sulfur vacancies of the ZnS:Ag, Al phosphor were decreased by the sulfurating treatment and the luminescent maintenance factor characteristics of the sulfurating treatment phosphor were improved, the same as the first embodiment, although sulfur vacancies were observed in the thermal glow curve of the phosphor core, the same as the first embodiment.

Sixteenth Embodiment

A sulfurating treatment of the present invention can be accomplished by annealing a phosphor core mixed with solid state sulfur powder. A ZnS:Ag,Al phosphor core was mixed with solid state sulfur powder and packed into a crucible. Carbon powder was introduced to control the atmosphere. It was annealed at a treatment temperature of 350° C. After crushing lightly the sulfurating treatment phosphor, it was sieved to obtain the sulfurating treatment phosphor used for the present invention. Sulfur vacancies of the ZnS:Ag,Al phosphor were decreased by the sulfurating treatment and the luminescent maintenance factor characteristics of the sulfurating treatment phosphor were improved, the same as the first embodiment, although sulfur vacancies were observed in the thermal glow curve of the phosphor core, the same as the first embodiment.

Seventeenth Embodiment

A sulfurating treatment of the present invention can be accomplished by annealing a phosphor core in a way whereby solid state sulfur is placed around a phosphor core. Solid state sulfur was placed around a crucible in which a ZnS:Ag,Al phosphor core was packed, and they were set into a muffle furnace. Carbon powder was introduced to control the atmosphere. It was annealed at a treatment temperature of 300° C. After crushing lightly the sulfurating treatment phosphor, it was sieved to obtain the sulfurating treatment phosphor used for the present invention. Sulfur vacancies of the ZnS:Ag,Al phosphor were decreased by the sulfurating treatment and the luminescent maintenance factor characteristics of the sulfurating treatment phosphor were improved, the same as the first embodiment, although sulfur vacancies were observed in the thermal glow curve of the phosphor core, the same as the first embodiment.

Eighteenth Embodiment

A sulfurating treatment of the present invention can be accomplished by annealing in a sulfur atmosphere after forming a phosphor layer inside of a faceplate. A faceplate coated by a phosphor layer was set into a quartz tube of a tubular synthesis furnace. After a complete purge with Ar gas, the sulfurating treatment was carried out in hydrogen sulfide atmosphere by flowing $H_2S$ gas at 200 ml/min into the quartz tube. The luminescent maintenance factor characteristics of the sulfurating treatment phosphor layer after annealing at 400° C. for a half hour were improved, the same as the first embodiment.

Nineteenth Embodiment

A sulfurating treatment of the present invention can be accomplished by placing solid state sulfur around a phosphor layer coated faceplate. A faceplate coated by a phosphor layer was set with solid state sulfur into a quartz tube of a tubular synthesis furnace. After a complete purge with Ar gas, the sulfurating treatment was carried out. It was annealed at a treatment temperature of 400° C. for one hour. The luminescent maintenance factor characteristics of the sulfurating treatment phosphor layer were improved, the same as the first embodiment.

Twentieth Embodiment

A sulfurating treatment of the present invention can be accomplished by annealing a faceplate coated by a phosphor layer in a 10% $H_2S/H_2$ gas atmosphere. A faceplate coated by a phosphor layer was set into a quartz tube of a tubular synthesis furnace. After a complete purge with Ar gas, the sulfurating treatment was carried out under flowing 10% $H_2S/H_2$ gas with controlled flow rate. It was annealed at a treatment temperature of 400° C. for one hour. The luminescent maintenance factor characteristics of the sulfurating treatment phosphor layer were improved, the same as the first embodiment.

Twenty-first Embodiment

A sulfurating treatment of the present invention can be accomplished by annealing a faceplate coated by a phosphor layer in carbon dioxide gas atmosphere. A faceplate coated by a phosphor layer was set into a quartz tube of a tubular synthesis furnace. After a complete purge with Ar gas, the sulfurating treatment was carried out under flowing carbon dioxide gas with controlled the flow rate. It was annealed at a treatment temperature of 200° C. for one hour. The luminescent maintenance factor characteristics of the sulfurating treatment phosphor layer were improved, the same as the first embodiment.

Twenty-second Embodiment

A ZnMgS:Cu,Al sulfurating treatment phosphor of the present invention can be manufactured in the following manner. Regarding the phosphor core, MgS was added to the raw material of the first embodiment; it was fired and post-treated in the same way, and then a sulfurating treatment was carried out in the same way as the first embodiment. As a result, the luminescent maintenance factor characteristics of the sulfurating treatment phosphor were improved compared with the phosphor core.

Twenty-third Embodiment

A ZnCaS:Cu,Al sulfurating treatment phosphor of the present invention can be manufactured in the following manner. Regarding the phosphor core, CaS was added to the raw material of the first embodiment; it was fired and post-treated in the same way, and then a sulfurating treatment was carried out in the same way as the first embodiment. As a result, the luminescent maintenance factor characteristics of the sulfurating treatment phosphor were improved compared with the phosphor core.

Twenty-fourth Embodiment

A ZnSrS:Cu,Al sulfurating treatment phosphor of the present invention can be manufactured in the following manner. Regarding the phosphor core, SrS was added to the raw material of the first embodiment; it was fired and post-treated in the same way, and then a sulfurating treatment was carried out in the same way as the first embodiment. As a result, the luminescent maintenance factor characteristics of the sulfurating treatment phosphor were improved compared with the phosphor core.

Twenty-fifth Embodiment

A ZnMgS:Cu,Ga sulfurating treatment phosphor of the present invention can be manufactured in the following manner. Regarding the phosphor core, MgS was added to the raw material of the first embodiment, and Ga raw material was added in lieu of Al raw material; it was fired and post-treated in the same way, and then a sulfurating treatment was carried out in the same way as the first embodiment. As a result, the luminescent maintenance factor characteristics of the sulfurating treatment phosphor were improved compared with the phosphor core.

Twenty-sixth Embodiment

A ZnMgS:Cu,In sulfurating treatment phosphor of the present invention can be manufactured in the following manner. Regarding the phosphor core, CaS was added to the raw material of the first embodiment, and In raw material was added in lieu of Al raw material; it was fired and post-treated in the same way, and then a sulfurating treatment was carried out in the same way as the first embodiment. As a result, the luminescent maintenance factor characteristics of the sulfurating treatment phosphor were improved compared with the phosphor core.

Twenty-seventh Embodiment

A ZnMgS:Cu, Al, Ga sulfurating treatment phosphor of the present invention can be manufactured in the following manner. Regarding the phosphor core, MgS was added to the raw material of the first embodiment, and Ga raw material was also added; it was fired and post-treated in the same way, and then a sulfurating treatment was carried out in the same way as the first embodiment. As a result, the luminescent maintenance factor characteristics of the sulfurating treatment phosphor were improved compared with the phosphor core.

Twenty-eighth Embodiment

A ZnMgSrS:Cu,Al sulfurating treatment phosphor of the present invention can be manufactured in the following manner. Regarding the phosphor core, MgS and SrS were added to the raw material of the first embodiment, fired and post-treated in the same way, and then a sulfurating treatment was carried out in the same way as the first embodiment. As a result, the luminescent maintenance factor characteristics of the sulfurating treatment phosphor were improved compared with the phosphor core.

Twenty-ninth Embodiment

A ZnS:Ag,Cu,Au,Al sulfurating treatment phosphor of the present invention can be manufactured in the following manner. Regarding the phosphor core, Ag and Au solutions were added to the raw material of the first embodiment, fired and post-treated in the same way, and then a sulfurating treatment was carried out in the same way as the first embodiment. As a result, the luminescent maintenance factor characteristics of the sulfurating treatment phosphor were improved compared with the phosphor core.

Thirtieth Embodiment

A ZnS:Ag,Cu,Al sulfurating treatment phosphor of the present invention can be manufactured in the following manner. Regarding the phosphor core, Ag raw material is added to the raw material of the first embodiment, fired and post-treated in the same way, and then a sulfurating treatment was carried out in the same way as the first embodiment. As a result, the luminescent maintenance factor characteristics of the sulfurating treatment phosphor were improved compared with the phosphor core.

Thirty-first Embodiment

A ZnMgS:Ag,Al sulfurating treatment phosphor of the present invention can be manufactured in the following manner. Regarding the phosphor core, MgS was added to the raw material of the first embodiment, fired and post-treated in the same way, and then a sulfurating treatment was carried out in the same way as the first embodiment. As a result, the luminescent maintenance factor characteristics of the sulfurating treatment phosphor were improved compared with the phosphor core.

Thirty-second Embodiment

A ZnCaS:Ag,Al sulfurating treatment phosphor of the present invention can be manufactured in the following manner. Regarding the phosphor core, CaS was added to the raw material of the second embodiment, fired and post-treated in the same way, and then a sulfurating treatment was carried out in the same way as the first embodiment. As a result, the luminescent maintenance factor characteristics of the sulfurating treatment phosphor were improved compared with the phosphor core.

Thirty-third Embodiment

A ZnSrS:Ag,Al sulfurating treatment phosphor of the present invention can be manufactured in the following manner. Regarding the phosphor core, SrS was added to the raw material of the second embodiment, fired and post-treated in the same way, and then a sulfurating treatment was carried out in the same way as the first embodiment. As a result, the luminescent maintenance factor characteristics of the sulfurating treatment phosphor were improved compared with the phosphor core.

Thirty-fourth Embodiment

A ZnMgS:Ag,Ga sulfurating treatment phosphor of the present invention can be manufactured in the following manner. Regarding the phosphor core, MgS was added to the raw material of the second embodiment, Ga raw material was added in lieu of Al raw material, fired and post-treated in the same way, and then a sulfurating treatment was carried out in the same way as the first embodiment. As a result, the luminescent maintenance factor characteristics of the sulfurating treatment phosphor were improved compared with the phosphor core.

Thirty-fifth Embodiment

A ZnMgS:Ag,In sulfurating treatment phosphor of the present invention can be manufactured in the following manner. Regarding the phosphor core, MgS was added to the raw material of the second embodiment, In raw material was added in lieu of Al raw material, fired and post-treated in the same way, and then a sulfurating treatment was carried out in the same way as the first embodiment. As a result, the luminescent maintenance factor characteristics of the sulfurating treatment phosphor were improved compared with the phosphor core.

Thirty-sixth Embodiment

A ZnMgS:Ag,Al,Ga sulfurating treatment phosphor of the present invention can be manufactured in the following manner. Regarding the phosphor core, MgS was added to the raw material of the second embodiment, Ga raw material was added, fired and post-treated in the same way, and then a sulfurating treatment was carried out the same way as the first embodiment. As a result, the luminescent maintenance factor characteristics of the sulfurating treatment phosphor were improved compared with the phosphor core.

Thirty-seventh Embodiment

A ZnMgSrS:Ag,Al sulfurating treatment phosphor of the present invention can be manufactured in the following manner. Regarding the phosphor core, MgS and SrS were added to the raw material of the second embodiment, fired and post-treated in the same way, and then a sulfurating treatment was carried out in the same way as the first embodiment. As a result, the luminescent maintenance factor characteristics of the sulfurating treatment phosphor were improved compared with the phosphor core.

Thirty-eighth Embodiment

A ZnS:Ag,Al,Tm sulfurating treatment phosphor of the present invention can be manufactured in the following manner. Regarding the phosphor core, Tm raw material was added to the raw material of the second embodiment, fired and post-treated in the same way, and then a sulfurating treatment was carried out in the same way as the first embodiment. Adding Tm to ZnS creates blue luminescence centers. As a result, the luminescent maintenance factor characteristics of the sulfurating treatment phosphor were improved compared with the phosphor core.

Thirty-ninth Embodiment

A ZnS:Ag,Al,Ce sulfurating treatment phosphor of the present invention can be manufactured in the following manner. Regarding the phosphor core, Ce raw material was added to the raw material of the second embodiment, fired and post-treated in the same way, and then a sulfurating treatment was carried out in the same way as the first embodiment. As a result, the luminescent maintenance factor characteristics of the sulfurating treatment phosphor were improved compared with the phosphor core.

Fortieth Embodiment

A ZnS:Ag,Al,Eu sulfurating treatment phosphor of the present invention can be manufactured in the following manner. Regarding the phosphor core, Eu raw material was added to the raw material of the second embodiment, fired and post-treated in the same way, and then a sulfurating treatment was carried out in the same way as the first embodiment. As a result, the luminescent maintenance factor characteristics of the sulfurating treatment phosphor were improved compared with the phosphor core.

Forty-first Embodiment

A ZnS:Ag,Al,Tb sulfurating treatment phosphor of the present invention can be manufactured in the following manner. Regarding the phosphor core, Tb raw material was added to the raw material of the second embodiment, fired and post-treated in the same way, and then a sulfurating treatment was carried out in the same way as the first embodiment. As a result, the luminescent maintenance factor characteristics of the sulfurating treatment phosphor were improved compared with the phosphor core.

Forty-second Embodiment

A ZnMgS:Ag,Al,Tm sulfurating treatment phosphor of the present invention can be manufactured in the following manner. Regarding the phosphor core, MgS and Tb raw materials were added to the raw material of the second embodiment, fired and post-treated in the same way, and then a sulfurating treatment was carried out in the same way as the first embodiment. Adding Tm to ZnS creates blue luminescence centers. As a result, the luminescent maintenance factor characteristics of the sulfurating treatment phosphor were improved compared with the phosphor core.

Forty-third Embodiment

A ZnMgS:Ag,Al,Ce sulfurating treatment phosphor of the present invention can be manufactured in the following manner. Regarding the phosphor core, MgS and Ce raw materials were addend to the raw material of the second embodiment, fired and post-treated in the same way, and then a sulfurating treatment was carried out in the same way as the first embodiment. As a result, the luminescent maintenance factor characteristics of the sulfurating treatment phosphor were improved compared with the phosphor core.

Forty-fourth Embodiment

A ZnMgS:Ag,Al,Eu sulfurating treatment phosphor of the present invention can be manufactured in the following manner. Regarding the phosphor core, MgS and Eu raw materials were added to the raw material of the second embodiment, fired and post-treated in the same way, and then a sulfurating treatment was carried out in the same way as the first embodiment. As a result, the luminescent maintenance factor characteristics of the sulfurating treatment phosphor were improved compared with the phosphor core.

Forty-fifth Embodiment

A ZnMgS:Ag,Al,Tb sulfurating treatment phosphor of the present invention can be manufactured in the following manner. Regarding the phosphor core, MgS and Tb materials were addend in the raw material of the second embodiment, fired and post-treated in the same way, and then a sulfurating treatment was carried out in the same way as the first embodiment. As a result, the luminescent maintenance factor characteristics of the sulfurating treatment phosphor were improved compared with the phosphor core.

In the following examples are described several preferred embodiments to illustrate the invention. However, these examples are not intended to be limited to the specific embodiments, and it is to be understood that various changes and modifications may be made in the invention without departing from the objective of the present invention.

Forty-sixth Embodiment

A display with MIM-Type Electron Source, No.1

Figure 12:
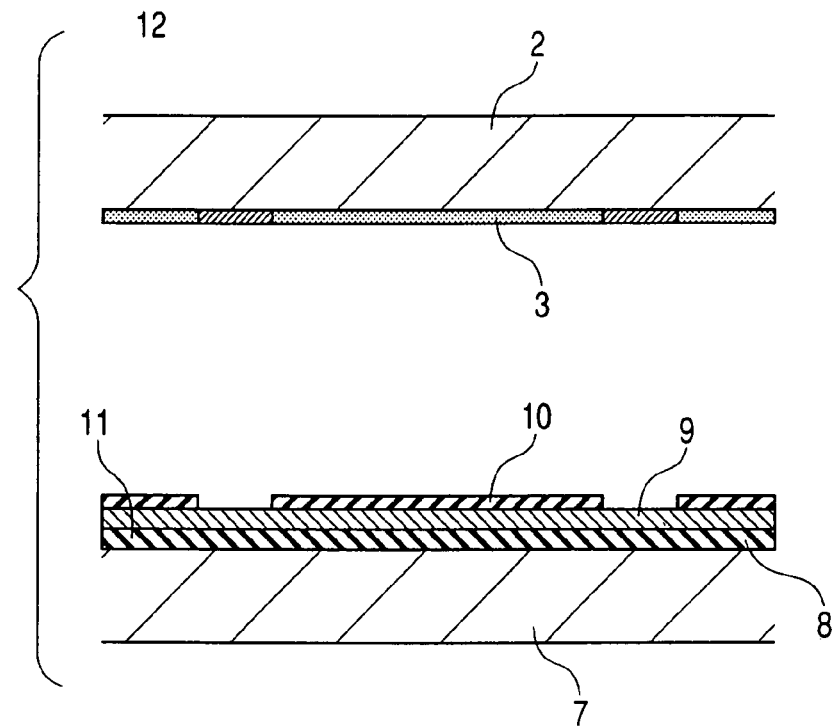
FIG. 12 is a pattern diagram illustrating the entire structure of a display with an MIM-type electron source of the present invention.

A display with MIM-type electron source of the present invention is shown in FIG. 12. A display 12 with MIM-type electron source consists of a faceplate 2, an MIM-type electron source 11, and a rear plate 7. The MIM-type electron source 11 consists of a bottom electrode (Al) 8, an insulator layer ($Al_2O_3$) 9, and a top electrode (Ir—Pt—Au) 10. Particularly, inside the faceplate 2, there is a phosphor layer 3 which was formed by the sulfurating treatment $Y_2O_2S$:Eu as a red phosphor, the sulfurating treatment ZnS:Cu,Al as a green phosphor, and the sulfurating treatment ZnS:Ag,Al as a blue phosphor. The median diameter of the phosphor was 6 μm. In order to increase the resolution, a black conductive material was provided in each pixel. The black conductive material was fabricated by coating a photoresist layer all over the plate, exposing it through a mask, and developing it, thereby leaving only parts of the photoresist layer to remain. Then, after forming a graphite layer on the entire face, the photoresist layer and the graphite on top of it were removed by reaction with hydrogen peroxide etc, resulting in the formation of the black conductive material.

A screen-printing method was employed to coat a phosphor layer. The phosphor was prepared in paste form by mixing with a vehicle containing a cellulosic resin etc. as a main component. Next, it was imprinted through a stainless mesh. A segregated coat of red, green, and blue was obtained by aligning the positions of the mesh holes and the positions of each phosphor layer together. Then, the phosphor layer formed by printing was fired to remove the mixed cellulosic resin etc. The phosphor pattern was manufactured in this way. The average thickness of the phosphor layer was controlled to be 10 μm. The metal back was formed by vapor deposition of Al in vacuum after the filming processing inside the phosphor layer 3. Then, the filming material was burned off by heat treatment; thereby completing phosphor layer 3.

Figure 16:
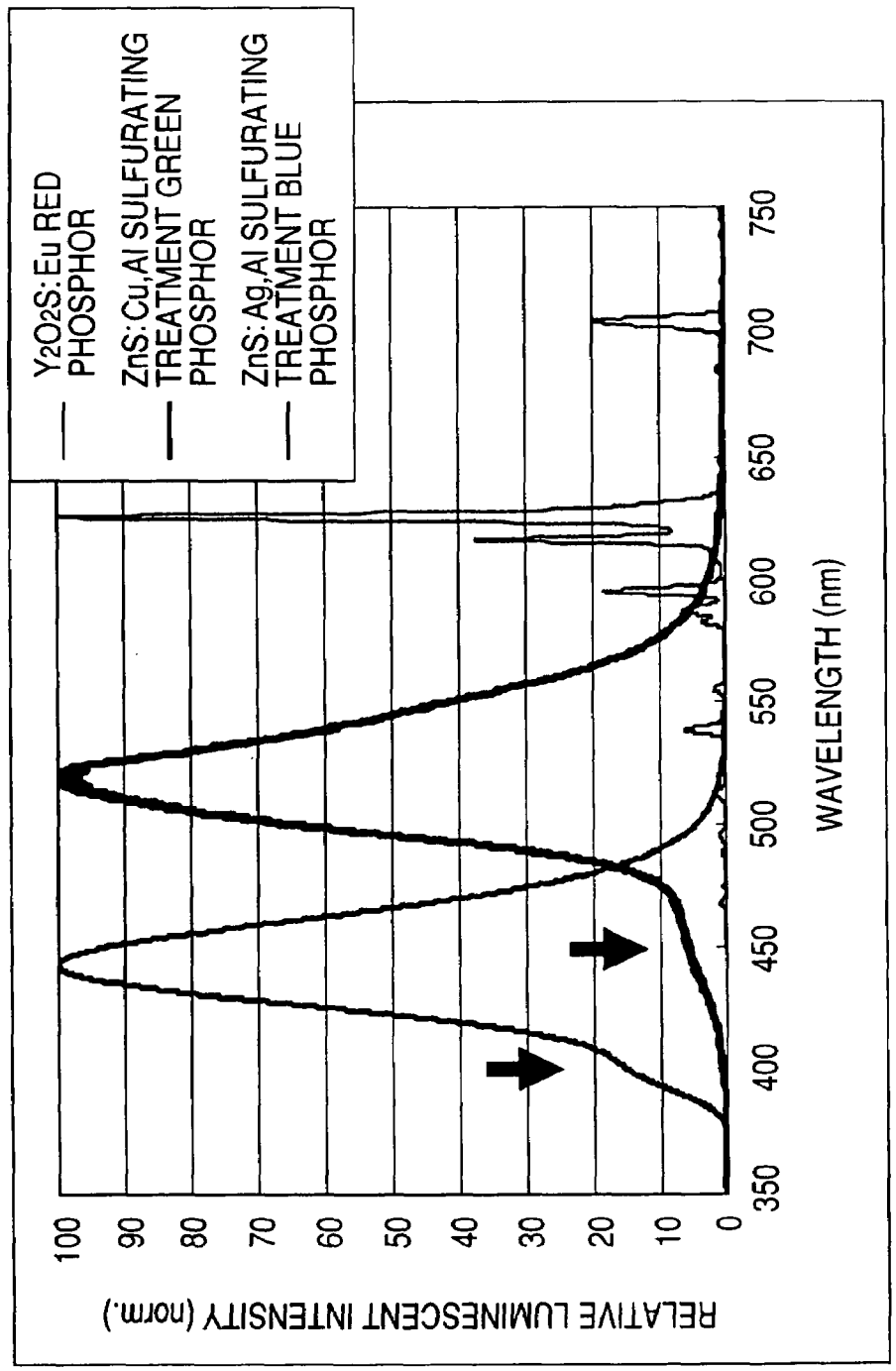
FIG. 16 is a graph showing the cathode-luminescence spectrum of a display of MIM-type electron source of the present invention.

FIG. 16 shows the cathode-luminescence spectrum of a display with MIM type electron source. Shoulders were observed at around 400 nm of blue luminescence and around 450 nm of green luminescence. According to the present invention, the luminescent maintenance factor was improved compared with the prior art of displays with MIM-type electron source, and excellent brightness was obtained even after displaying a long time.

Forty-seventh Embodiment

A display with MIM-Type Electron Source, No.2

A display with MIM-type electron source of the present invention is shown in FIG. 12. Particularly, inside the faceplate 2, there is a phosphor layer 3 which was formed by the sulfurating treatment $Y_2O_2S$:Eu as a red phosphor, the $Y_2SiO_5$:Tb as a green phosphor, and the sulfurating treatment ZnS:Ag,Cl as a blue phosphor. Additionally, a conductive material MgO was mixed into the phosphor to lower the resistance of the phosphor. The median diameter of the phosphor and the layer thickness were 4 μm and 7 μm, respectively. The methods of forming the phosphor layer, the black conductive material and metal back are the same as those of the forty-sixth embodiment. The luminescent maintenance factor of the present invention was excellent, the same as the forty-sixth embodiment.

Forty-eighth Embodiment

A display with MIM-Type Electron Source, No.3

A display with MIM-type electron source of the present invention is shown in FIG. 12. Particularly, inside the faceplate 2, there is a phosphor layer 3 which was formed by the $Y_2O_3$:Eu as a red phosphor, the sulfurating treatment ZnS:Cu,Al as a green phosphor, and the sulfurating treatment ZnS:Ag,Al as a blue phosphor. Additionally, a conductive material $Sn_2O$ was mixed into the phosphor to lower the resistance of the phosphor. The median diameters of the red and green phosphors and the blue phosphor were 6 μm and 7 μm, respectively.

The layer thicknesses of the red and green phosphors and the blue phosphor were 10 μm and 15 μm, respectively. The methods of forming the phosphor layer, the black conductive material and metal back were the same as those of the forty-sixth embodiment. The luminescent maintenance factor of the present invention was excellent, the same as the forty-sixth embodiment.

Forty-ninth Embodiment

A display with MIM-Type Electron Source, No.4

A display with MIM-type electron source of the present invention is shown in FIG. 12. Particularly, inside the faceplate 2, there is a phosphor layer 3 which was formed by the $Y_2O_3$:Eu as a red phosphor, the $Y_2SiO_5$:Tb as a green phosphor, and the sulfurating treatment ZnS:Ag,Al as a blue phosphor. Additionally, a conductive material $In_2O_3$ was mixed into the phosphor to lower the resistance of the phosphor. The median diameter of the phosphor and the thickness of the phosphor layer were 6 μm and 10 μm, respectively. The methods of forming the phosphor layer, the black conductive material and metal back were the same as those of the forty-sixth embodiment. The luminescent maintenance factor of the present invention was excellent, the same as the forty-sixth embodiment.

Fiftieth Embodiment

A display with MIM-Type Electron Source, No.4

A display with MIM-type electron source of the present invention is shown in FIG. 12. Particularly, inside the faceplate 2, there is a phosphor layer 3 which was formed by the $Y_2O_3$:Eu as a red phosphor, the sulfurating treatment ZnS:Cu,Au,Al as a green phosphor, and the sulfurating treatment ZnS:Ag,Cl as a blue phosphor. The median diameter of the red phosphor and that of the green and blue phosphors were 6 μm and 4 μm, respectively. The thicknesses of the red phosphor layer and that of the green and blue phosphor layers were 12 μm and 8 μm, respectively. The methods of forming the phosphor layer, the black conductive material and metal back were the same as those of the forty-sixth embodiment. The luminescent maintenance factor of the present invention was excellent, the same as the forty-sixth embodiment.

Fifty-first Embodiment

A display with Spindt-Type Electron Source, No.1

Figure 13:
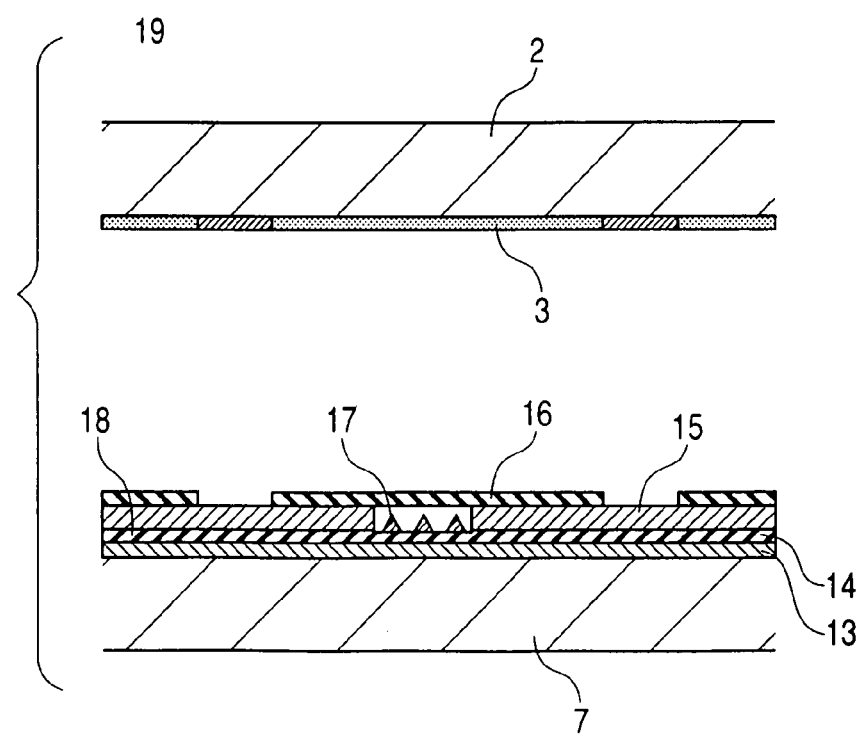
FIG. 13 is a pattern diagram illustrating the entire structure of a display with spindt-type electron source of the present invention.

A display with spindt-type electron source of the present invention is shown in FIG. 13. A display with a spindt-type electron source 19 consists of the face plate 2, the spindt-type electron source 18, and the rear plate 7, and the spindt-type electron source 18 consists of the cathode 13, resistance layer 14, insulator layer 15, gate 16, and the spindt-type electron emitter (Mo etc.) 17. Particularly, inside the faceplate 2, there is a phosphor layer 3 which was formed by the sulfurating treatment $Y_2O_2S$:Eu as a red phosphor, the sulfurating treatment ZnS:Cu,Al as a green phosphor, and the sulfurating treatment ZnS:Ag,Al as a blue phosphor. The methods of forming the phosphor layer, the black conductive material and metal back were the same as the forty-sixth embodiment. The luminescent maintenance factor of the present invention was excellent, the same as the forty-sixth embodiment.

Fifty-second Embodiment

A display with Spindt-Type Electron Source, No.2

A display with spindt-type electron source of the present invention is shown in FIG. 13. Particularly, inside the faceplate 2, there is a phosphor layer 3 which was formed by the $Y_2O_3$:Eu as a red phosphor, the sulfurating treatment ZnS:Cu,Al as a green phosphor, and the sulfurating treatment ZnS:Ag,Cl as a blue phosphor. The methods of forming the phosphor layer, the black conductive material and metal back were the same as those of the forty-sixth embodiment. The luminescent maintenance factor of the present invention was excellent, the same as the forty-sixth embodiment.

Fifty-third Embodiment

A display with Spindt-Type Electron Source, No.3

A display with spindt-type electron source of the present invention is shown in FIG. 13. Particularly, inside the faceplate 2, there is a phosphor layer 3 which was formed by the $Y_2O_3$:Eu as a red phosphor, the $Y_2SiO_5$:Tb as a green phosphor, and the sulfurating treatment ZnS:Ag,Al as a blue phosphor. The methods of forming the phosphor layer, the black conductive material and metal back were the same as those of the forty-sixth embodiment. The luminescent maintenance factor of the present invention was excellent, the same as the forty-sixth embodiment.

Fifty-fourth Embodiment

A display with Carbon Nanotube Type Electron Source, No.1

Figure 14:
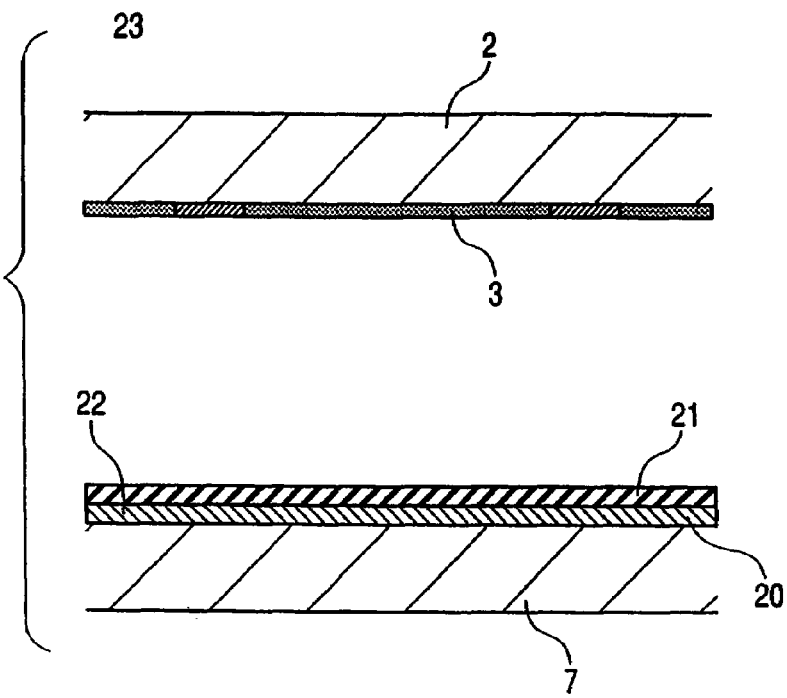
FIG. 14 is a pattern diagram illustrating the entire structure of a display with carbon nanotube type electron source of the present invention.

A display with carbon nanotube type electron source of the present invention is shown in FIG. 14. A display with carbon nanotube type electron source 23 consists of the face plate 2, carbon nanotube type electron source 22, and rear plate 7, and the carbon nanotube type electron source consists of electrode 20 and carbon nanotube layer 21. Particularly, inside the faceplate 2, there is a phosphor layer 3 which was formed by the sulfurating treatment $Y_2O_2S$:Eu as a red phosphor, the sulfurating treatment ZnS:Cu,Al as a green phosphor, and the sulfurating treatment ZnS:Ag,Al as a blue phosphor. The methods of forming the phosphor layer, the black conductive material and metal back were the same as those of the forty-sixth embodiment. The luminescent maintenance factor of the present invention was excellent, the same as the forty-sixth embodiment.

Fifty-fifth Embodiment

A display with Carbon Nanotube Type Electron Source, No.2

A display with a carbon nanotube type electron source of the present invention is shown in FIG. 14. Particularly, inside the faceplate 2, there is a phosphor layer 3 which was formed by the $Y_2O_3$:Eu as a red phosphor, the sulfurating treatment ZnS:Cu,Al as a green phosphor, and the sulfurating treatment ZnS:Ag,Cl as a blue phosphor. The methods of forming the phosphor layer, the black conductive material and metal back were the same as those of the forty-sixth embodiment. The luminescent maintenance factor of the present invention was excellent, the same as the forty-sixth embodiment.

Fifty-sixth Embodiment

A display with carbon nanotube type electron source, No.3

A display with carbon nanotube type electron source of the present invention is shown in FIG. 14. Particularly, inside the faceplate 2, there is a phosphor layer 3 which is formed by the $Y_2O_3$:Eu as a red phosphor, the $Y_2SiO_5$:Tb as a green phosphor, and the sulfurating treatment ZnS:Ag,Al as a blue phosphor. The methods of forming the phosphor layer, the black conductive material and metal back were the same as those of the forty-sixth embodiment. The luminescent maintenance factor of the present invention was excellent, the same as the forty-sixth embodiment.

Fifty-seventh Embodiment

Vacuum Fluorescent Display, No.1

Figure 15A:
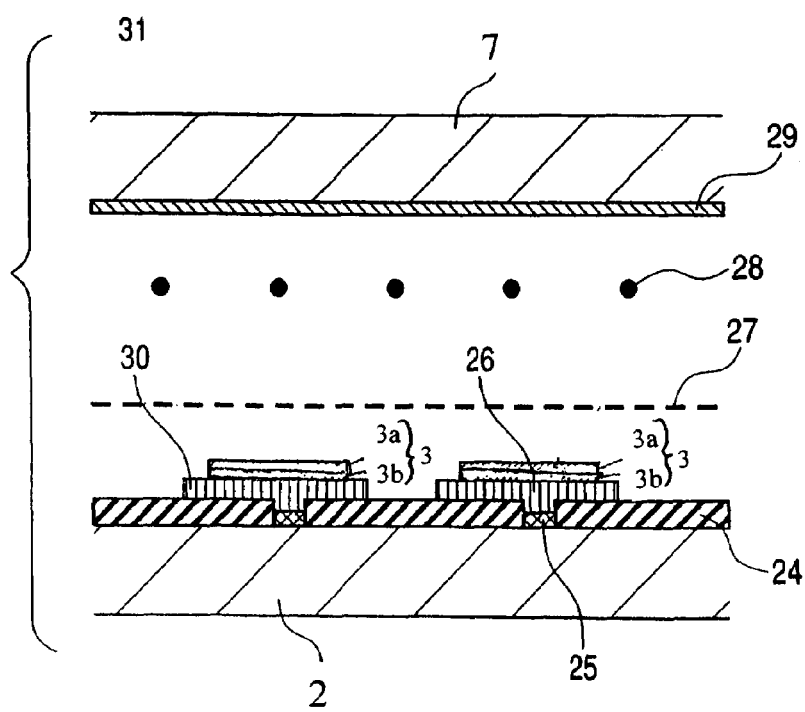
FIG. 15 is a pattern diagram illustrating the entire structure of a vacuum fluorescent display of the present invention.
Figure 15B:
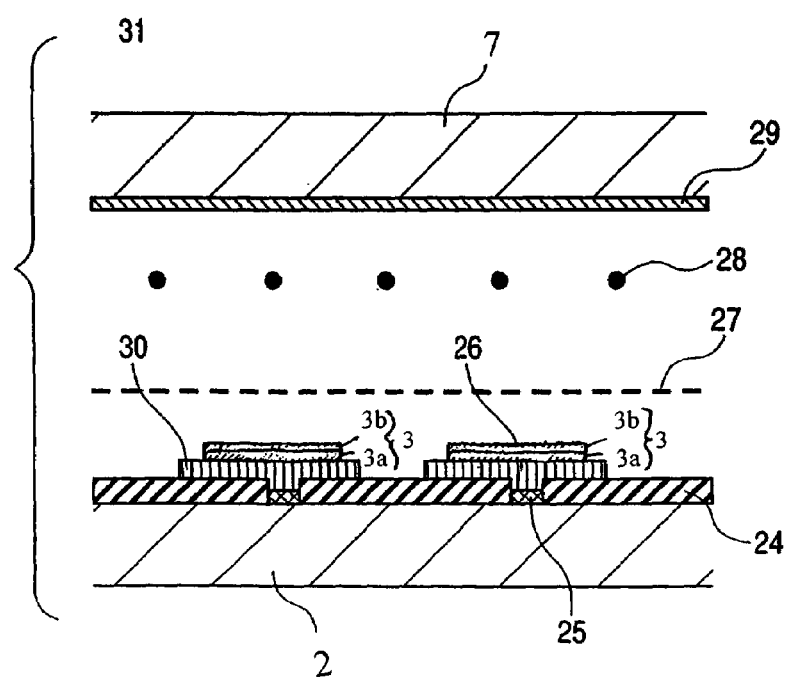

A vacuum fluorescent display of the present invention is shown in FIG. 15(A) and (B). A vacuum fluorescent display 31 consists of the rear plate 7, the filament 28, the grid 27, the transparent conductive layer 29, the anode 30 and the faceplate 2, and the anode consists of the insulator layer 24, the through hole 25, the anode electrode 26, and the phosphor layer 3 which comprises a highly crystalline first layer 3a and a second layer 3b. Particularly, inside the faceplate 2, there is a phosphor layer 3 which was formed by the sulfurating treatment ZnCdS: Ag, Cl as a red phosphor, the sulfurating treatment ZnS: Cu, Al as a green phosphor, and the sulfurating treatment ZnS: Cl as a blue phosphor. $In_2O_3$ was mixed in the phosphor layer as a conductive material. Because surface vacancies were reduced by the sulfurating treatment, decomposition of sulfur in the phosphor, which was the cause of filament contamination, was suppressed. The luminescent maintenance factor of the present invention was excellent, the same as the forty-sixth embodiment.

Fifty-eighth Embodiment

Vacuum fluorescent display, No.2

A vacuum fluorescent display of the present invention is shown in FIG. 15(A) and (B).

Particularly, inside the faceplate 2, there is a phosphor layer 3 which was formed by the sulfurating treatment ZnCdS:Ag,Cl as a red phosphor, the sulfurating treatment ZnS:Cu,Au,Al as a green phosphor, and the sulfurating treatment ZnS:Cl as a blue phosphors, and which comprises a highly crystalline first layer 3a and a second layer 3b. $In_2O_3$ was mixed in the phosphor layer as a conductive material. The luminescent maintenance factor of the present invention was excellent, the same as the forty-sixth embodiment.

Fifty-ninth Embodiment

Vacuum fluorescent display, No.3

A vacuum fluorescent display of the present invention is shown in FIG. 15(A) and (B).

Particularly, inside the faceplate 2, there is a phosphor layer 3 which was formed by the sulfurating treatment ZnCdS:Ag, Cl as a red phosphor, the sulfurating treatment ZnS:Cu,Al as a green phosphor, and the $ZnGa_2O_4$ as a blue phosphor, and which comprises a highly crystalline first layer 3a and a second layer 3b. $In_2O_3$ was mixed in the phosphor layer as a conductive material. The luminescent maintenance factor of the present invention was excellent, the same as the forty-sixth embodiment.

A field-emission display of the present invention can be made for practical use as a display having excellent characteristics of luminescence life because the characteristics of deterioration against electron-beam irradiation have been improved.

What is claimed is:

1. A display comprising a faceplate on which a phosphor layer is formed and an electron source which irradiates an electron beam onto said phosphor layer, wherein
   the phosphor constituting said phosphor layer has the component ZnS:M,N where M is one or more elements selected from Cu, Ag and Au, and N is one or more elements selected from Al, Ga, In, and Cl, and
   the temperature characteristics, which are obtained by detecting the amount of luminescence while increasing the temperature of the phosphor at a constant heating rate by exciting the phosphor with light of 168 nm vacuum-ultraviolet rays, have a peak in the amount of luminescence at around 190K
   wherein said phosphor layer comprises
   a highly crystalline first layer comprising ZnS:M,N and having a small amount of sulfur vacancies at the surface of the phosphor constituting said phosphor layer; and
   a second layer comprising ZnS:M,N and having a higher concentration of element M, and
   wherein the N/M mole ratio of said second layer is 0.5 or less, and the N/M mole ratio of the entire phosphor is 1.0 or more.

2. A display according to claim 1, wherein the amount of luminescence at 195K of the phosphor constituting said phosphor layer is 95% or more of the amount of luminescence at 155K during said increasing temperature.

3. A display according to claim 1, wherein the N/M mole ratio of said second layer comprising said phosphor layer is 0.2 or less.

* * * * *